United States Patent
Herbert

(10) Patent No.: US 8,300,438 B1
(45) Date of Patent: Oct. 30, 2012

(54) POWER FACTOR CORRECTED 3-PHASE AC-DC POWER CONVERTER USING NATURAL MODULATION

(76) Inventor: Edward Herbert, Canton, CT (US)

( * ) Notice: Subject to any disclaimer, the term of this patent is extended or adjusted under 35 U.S.C. 154(b) by 355 days.

(21) Appl. No.: 12/618,740

(22) Filed: Nov. 15, 2009

Related U.S. Application Data

(60) Provisional application No. 61/115,094, filed on Nov. 16, 2008, provisional application No. 61/148,031, filed on Jan. 28, 2009.

(51) Int. Cl.
*H02M 7/00* (2006.01)
(52) U.S. Cl. ............... 363/69; 363/71; 363/124
(58) Field of Classification Search ............ 363/65, 363/67, 69, 81, 124, 125, 71
See application file for complete search history.

(56) References Cited

U.S. PATENT DOCUMENTS

| | | | | |
|---|---|---|---|---|
| 4,974,141 A * | 11/1990 | Severinsky et al. | ............. | 363/81 |
| 5,402,060 A * | 3/1995 | Erisman | ............ | 323/268 |
| 5,406,470 A * | 4/1995 | Ridley et al. | ............ | 363/69 |
| 5,499,178 A * | 3/1996 | Mohan | ............. | 363/39 |
| 5,894,414 A * | 4/1999 | Jiang | ............. | 363/65 |
| 5,936,855 A * | 8/1999 | Salmon | ............. | 363/46 |
| 6,009,000 A * | 12/1999 | Siri | ............. | 363/21.09 |
| 6,055,169 A * | 4/2000 | Bowman et al. | ............. | 363/65 |
| 6,448,672 B1 * | 9/2002 | Voegeli et al. | ............. | 307/52 |
| 6,545,887 B2 * | 4/2003 | Smedley et al. | ............. | 363/89 |
| 6,651,178 B1 * | 11/2003 | Voegeli et al. | ............. | 713/300 |
| 6,731,524 B2 * | 5/2004 | Elek et al. | ............. | 363/70 |
| 6,853,167 B2 * | 2/2005 | Elek et al. | ............. | 323/207 |
| 6,882,130 B2 * | 4/2005 | Handa et al. | ............. | 320/135 |
| 7,139,180 B1 * | 11/2006 | Herbert | ............. | 363/124 |
| 7,170,268 B2 * | 1/2007 | Kim | ............. | 323/272 |
| 7,170,764 B2 * | 1/2007 | Vinciarelli | ............. | 363/65 |
| 7,423,892 B2 * | 9/2008 | Vinciarelli | ............. | 363/65 |
| 7,535,204 B1 * | 5/2009 | Nadimpalli et al. | ............. | 323/222 |
| 7,564,706 B1 * | 7/2009 | Herbert | ............. | 363/124 |
| 7,586,762 B2 * | 9/2009 | Hsu | ............. | 363/21.12 |
| 7,633,782 B1 * | 12/2009 | Herbert | ............. | 363/125 |
| 7,859,202 B2 * | 12/2010 | Lukic et al. | ............. | 318/139 |
| 7,872,886 B2 * | 1/2011 | Xu et al. | ............. | 363/65 |
| 7,888,923 B2 * | 2/2011 | Sahu | ............. | 323/283 |
| 8,030,788 B2 * | 10/2011 | Xu et al. | ............. | 290/31 |

* cited by examiner

Primary Examiner — Adolf Berhane

(57) ABSTRACT

A 3-phase pfc 100% duty-ratio buck converter and a 3-phase 0% duty-ratio boost converter can be used in parallel with their outputs in series to greatly reduce the ripple voltage in the output. They can also be used in series with their outputs in parallel to greatly reduce the ripple current in the output. A 3-phase 0% duty-ratio boost converter having isolated primary circuits for each phase is used when the inputs are in series.

2 Claims, 11 Drawing Sheets

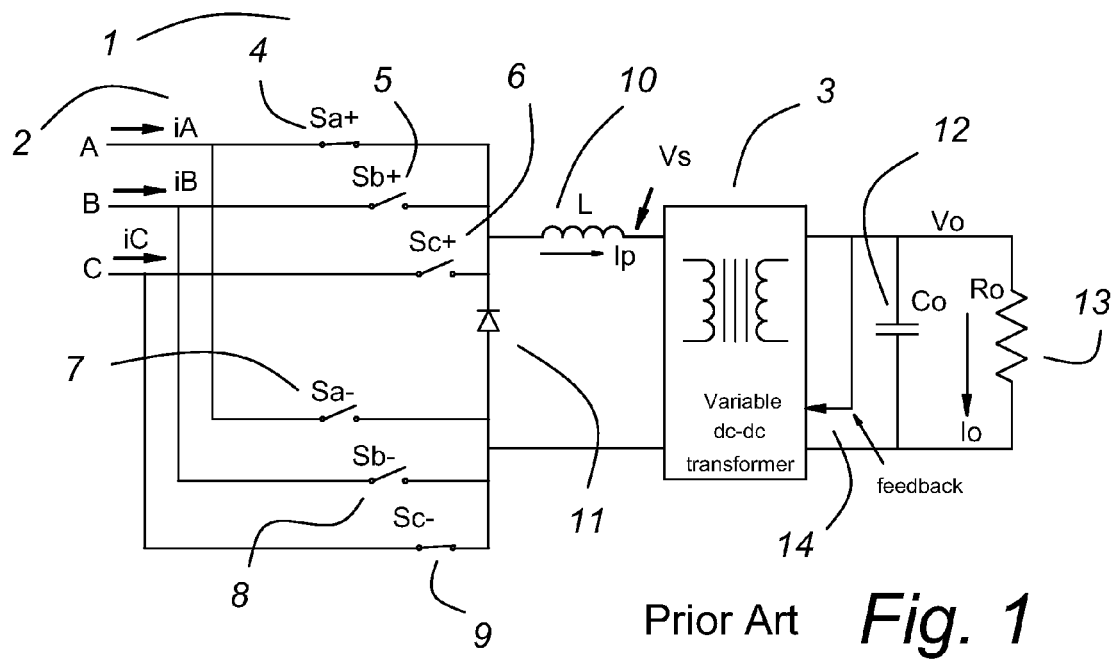
Prior Art  Fig. 1
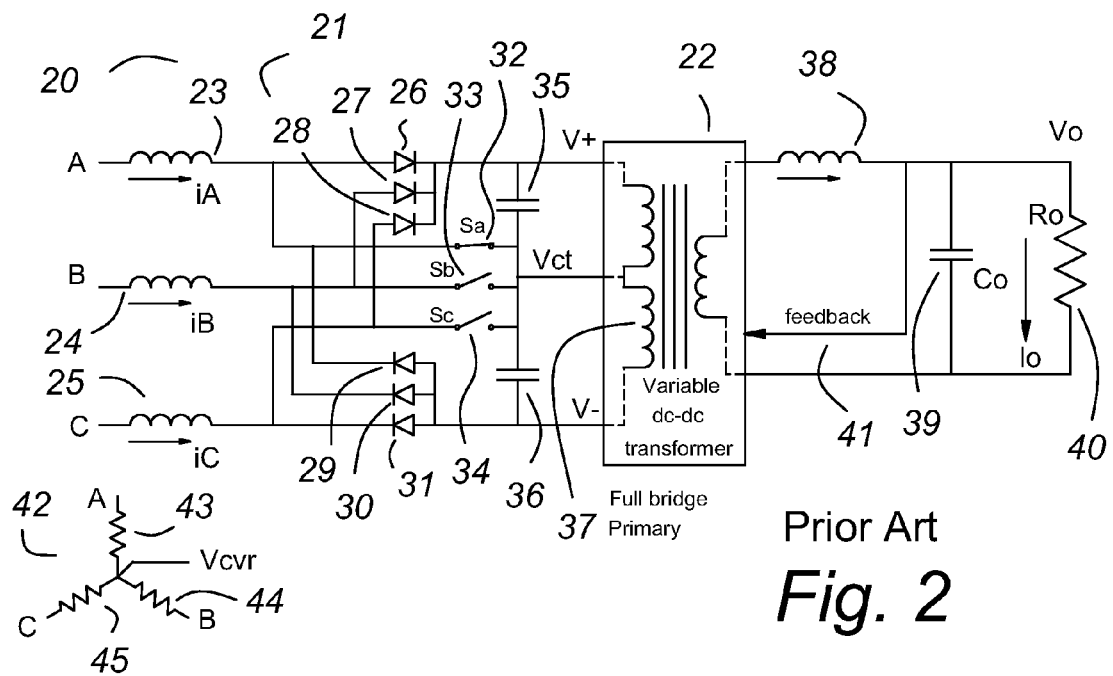
Prior Art Fig. 2

POWER FACTOR CORRECTED 3-PHASE AC-DC POWER CONVERTER USING NATURAL MODULATION

CROSS REFERENCE TO RELATED PATENT APPLICATIONS

This application is a continuation in part of a provisional U.S. patent application Ser. No. 61/115,094 filed Nov. 16, 2008 and entitled Power Factor Corrected 3-phase Ac-dc Power Converter using "Natural Modulation". This application is also a continuation in part of a provisional U.S. patent application Ser. No. 61/148,031 filed Jan. 28, 2009 and entitled Natural Modulation. Priority is claimed to the filing dates of these provisional US patent applications and they are incorporated herein by reference.

This patent application relates to U.S. patent application Ser. No. 11/943,864, filed Nov. 21, 2007, and entitled 100% Duty-Cycle Buck-Derived and 0% Duty-Cycle Boost-Derived Power Factor Corrected (PFC) 3-Phase Ac-Dc Power Converters. This patent application issued as U.S. Pat. No. 7,633,782 on Dec. 15, 2009. This patent application is incorporated herein by reference.

This patent application relates to U.S. patent application Ser. No. 11/767,516, filed Jun. 24, 2007, and entitled "Natural Modulation" for Maximizing Efficiency in Power Converters. This patent application issued as U.S. Pat. No. 7,609,037 on Oct. 22, 2009. This patent application is incorporated herein by reference.

BACKGROUND OF THE INVENTION

This invention relates to power factor corrected 3-phase ac-dc power converters, and in particular, 3-phase ac-dc converters operating from commercial power having fairly good regulation and having a fixed dc output voltage.

High efficiency and simplicity of control are desirable characteristics.

3-phase power factor correction (pfc) is much more efficient and much simpler than single-phase pfc because 3-phase power flow is continuous. Collectively, the power in a balanced 3-phase circuit is equivalent to dc. No energy needs to be shunted in and out of storage capacitors, an inefficient operation.

U.S. Pat. No. 7,633,782 teaches that a 3-phase buck converter has high efficiency when switched at "100% duty-ratio". 100% duty-ratio cannot be true literally for all three phases. It is defined as having 100% duty-ratio for the dominant phase, that is, the phase having the highest voltage magnitude, negative or positive, and the sum of the duty-ratios of the non-dominant phases equaling 100%. The duty-ratio for the phase A switches of a 3-phase pfc 100% duty-ratio buck converter is shown in FIG. 3.

Expressed as equations, the duty-ratios for a 3-phase pfc 100% duty-ratio buck converter are:

$$Da = \frac{SinX}{\max\{|SinX|, |Sin(X+120)|, |Sin(X+240)|\}}$$

$$Db = \frac{Sin(X+120)}{\max\{|SinX|, |Sin(X+120)|, |Sin(X+240)|\}}$$

$$Dc = \frac{Sin(X+240)}{\max\{|SinX|, |Sin(X+120)|, |Sin(X+240)|\}}$$

In a practical converter, the sine functions are derived from the phase voltages.

Neither the voltage nor the total current is controlled when operating at 100% duty-ratio, but the proportioning of the phase currents is controlled, ensuring balanced currents.

A 100% duty-ratio buck converter is shown in FIG. 1, as an example, not a limitation.

U.S. Pat. No. 7,633,782 also teaches that a 3-phase pfc boost converter has high efficiency when switched at "0% duty-ratio". 0% duty-ratio cannot be true literally for all three phases. It is defined as having 0% duty-ratio for the dominant phase, that is, the phase having the highest voltage magnitude, negative or positive, and the sum of the duty-ratios of the non-dominant phases equaling 100%. The duty-ratio for the phase A switch of a 3-phase 0% duty-ratio boost converter is shown in FIG. 5.

Expressed as equations, the duty-ratios for a 3-phase 0% duty-ratio boost converter are:

$$Da = \frac{|SinX|}{\max\{|SinX|, |Sin(X+120)|, |Sin(X+240)|\}}$$

$$Db = \frac{|Sin(X+120)|}{\max\{|SinX|, |Sin(X+120)|, |Sin(X+240)|\}}$$

$$Dc = \frac{|Sin(X+240)|}{\max\{|SinX|, |Sin(X+120)|, |Sin(X+240)|\}}$$

In a practical converter, the sine functions are derived from the phase voltages.

Neither the voltage nor the total current is controlled when operating at 0% duty-ratio, but the proportioning of the phase voltages at the inductors is controlled. Because even very small voltage errors will cause large current errors over time, current balance must be ensured by feedback.

A 3-phase pfc 0% duty-ratio boost power converter is shown in FIG. 2.

U.S. Pat. No. 7,633,782 also teaches using a current vector reference voltage Vcvr to ensure current balance. The current vector reference Vcvr is derived from a three-legged voltage divider of equal resistors from the three phase voltages, as shown in FIG. 2. The control algorithms are based upon the phase voltages, but because the power neutral is not connected even if it is present, the phase voltages are referenced to Vcvr. This largely compensates for phase voltage imbalance, if any, ensuring reasonably balanced currents even if the voltages are not balanced, as shown in FIG. 17.

For the 3-phase pfc 100% duty-ratio buck converter, the control algorithm controls the currents directly, ensuring current balance.

For the 3-phase pfc 0% duty-ratio boost converter the current control of the input currents senses any difference voltage between the current vector reference Vcvr and the transformer center-tap voltage Vct, with reference to FIG. 2. If the current vectors and the voltage vectors are not proportional, the voltage at the transformer center-tap will drift over time from that of the current vector reference. This difference voltage (error) can be used for feedback to modify the relative duty-ratios to correct the input currents with appropriate timing, gain and compensation for stability.

Used alone, both the 3-phase 100% duty-ratio buck converter and the 3-phase 0% duty-ratio boost converter have high output ripple voltages and must have post-regulators such as a variable dc-dc transformer to have a clean dc output voltage, as shown in FIGS. 1 and 2.

SUMMARY OF THE INVENTION

This invention teaches that the ripple voltages of the 3-phase pfc 100% duty-ratio buck converter and the 3-phase pfc 0% duty-ratio boost converters have complementary waveforms as shown in FIGS. 4 and 6. They can be used with their outputs in series as in FIG. 7, and the ripple voltage nearly cancels, as shown in FIG. 10. They can also be used with their outputs in parallel as shown in FIG. 8, and the output currents have ripple components that nearly cancel, as shown in FIG. 11.

This invention also teaches that when a 3-phase pfc 100% duty-ratio buck converter and a 3-phase pfc 0% duty-ratio boost converter are used in a series-parallel or a parallel-series arrangement, the series connections whether on the input or the output constrain the currents of both sections, giving effective control of the current balance to the 3-phase pfc 100% duty-ratio buck converter. Similarly, the parallel connections, whether on the input or the output constrain the voltages of both sections, giving effective control of the voltage to the 3-phase pfc 0% duty-ratio boost converter. When operating strictly according to the optimized algorithm, neither the currents nor the voltages are controlled, but current balance and pfc is ensured, and the output voltage is linearly proportional to the input voltages. This invention teaches that the duty-ratios of the non-dominant phases of the 3-phase pfc 0% duty-ratio boost converter can be varied slightly, to remove ripple, for load regulation and for small voltage adjustments.

This invention teaches a variation of the 3-phase pfc 0% duty-ratio boost converter having isolated transformer windings and switches so that it is suitable for series connection at the input with a 3-phase pfc 100% duty-ratio buck converter as shown in FIG. 8

This invention teaches that by using ac switches, the functions of the phase control switches can be done by the switches that control the transformer excitation.

This invention teaches that any of the 3-phase pfc power converters of this invention can be operated in reverse as a dc-ac converters because the circuits are reciprocal. The switches must be designed for the reversed current flow. Also, an ac-dc converter can be joined with a dc-ac converter to make an ac-ac converter.

BRIEF DESCRIPTION OF THE FIGURES

FIG. 1 shows a 100% duty-ratio 3-phase buck converter as taught in U.S. Pat. No. 7,633,782.

FIG. 2 shows a 0% duty-ratio 3-phase boost converter as taught in U.S. Pat. No. 7,633,782.

DETAILED DESCRIPTION

Figures 20, 21:
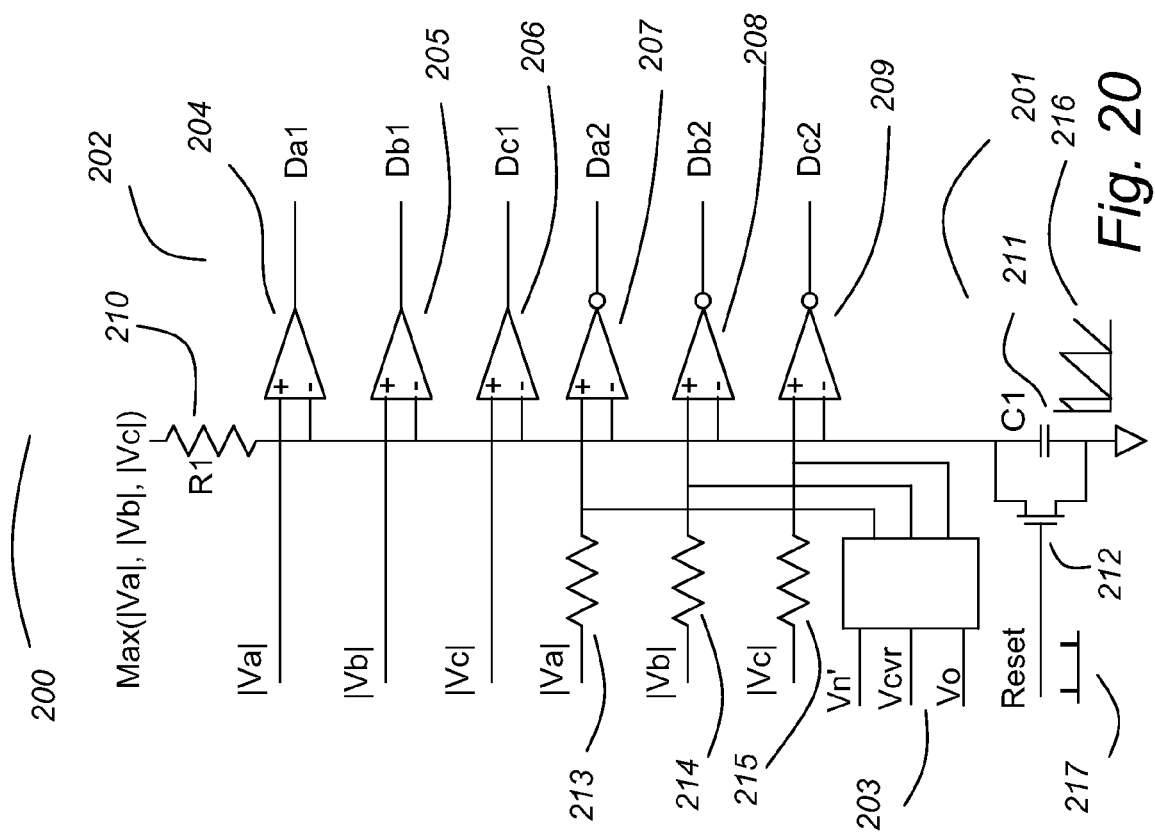
FIG. 20 shows the essential parts of an analog control.
FIG. 21 shows selected waveforms for analog control of FIG. 20.

With the exception of FIG. 21, all of the graphs in the figures are from SPICE simulation using the SPICE oscillograph function. The graphs were copied and pasted into a CAD program where they were edited for appearance, but none of the waveforms were altered.

The pfc 3-phase ac-dc power converter 1 of FIG. 1 uses ac switches 4 through 9 to switch the ac input voltages A, B and C to an inductor 10. A catch rectifier 1 conducts the current of the inductor 10 if the ac switches 4 through 9 are all off, as they may be part of the time during an over-voltage condition. An ac switch is defined as a switch that blocks voltage of either polarity when it is turned off. Back to back MOSFETs are commonly used as ac switches, as would be known by one skilled in the art of power converters. A variable dc-dc transformer 3 and an output capacitor 12 complete the circuit. The connections to the circuits within the variable dc-dc transformer 3 are not shown, as they are not a point of novelty. Variable dc-dc transformers include switching and rectifying circuits so that as an entirety the variable dc-dc transformer accepts a dc input voltage and provides a dc output voltage. The load is shown as a resistor 13. Feedback 14 is used to regulate the output voltage V0 by varying the effective turns-ratio of the variable dc-dc transformer 42.

FIG. 2 shows a 3-phase pfc boost ac-dc power converter 20. A 3-phase boost input stage 21 provides a positive voltage V+, and a negative voltage V− to a variable dc-dc transformer 22. The connections to the rest of the circuit within the variable dc-dc transformer 22 are shown dashed, as they are not literal. Variable dc-dc transformers include switching and rectifying circuits so that as an entirety the variable dc-dc transformer accepts a dc input voltage and provides a dc output voltage.

Because of the coupling through the primary winding 37 and the internal primary switching circuits, the voltages V+ and V− have equal voltage and opposite polarity with respect to the transformer center-tap voltage Vct.

An inductor 38 and an output capacitor 39 filter the output voltage of from the variable dc-dc transformer 22 to provide the output voltage V0. An output current Io flows through the load, shown as a resistor 40. Feedback 41 is provided from the output voltage V0 to the variable dc-dc transformer 22 to control the effective turns-ration so as to keep the output voltage V0 at a constant value.

In the 3-phase input boost circuit 21, three input inductors 23-25 connect respectively, individually, through positive boost rectifiers 26-28 to a positive boost capacitor 35 and connect respectively, individually, through negative boost rectifiers 29-31 to a negative boost capacitor 36. Three boost switches 32-36 can short, respectively, individually, the three input inductors 23-25 to the transformer center-tap, which is also the connection of the positive to the negative boost capacitors 35 and 36.

In many pfc circuits the boost capacitors store significant energy, perhaps to smooth the line frequency ripple of a single phase pfc circuit or for significant hold up time. The positive and negative boost capacitors 35 and 36 preferably are small and do not store much energy. Optimally, they smooth the voltage waveforms at the switching frequency but the time constant is small compared to the period of the line frequency inputs. Excess energy storage compromises the ability of the power converter to correct the power factor of the input currents iA, iB and iC. If greater energy storage is needed, as for hold up time, it is preferred that it be provided in another circuit.

During normal operation, the boost switch 32, 33 or 34 that is associated with the dominant phase (the phase A, B or C that has the highest voltage magnitude at an instant) is open and is not switching. Assuming that there is sufficient load current through the variable dc-dc transformer 22 to bleed the boost capacitors 35 and 36 so that they do not peak charge, the dominant phase voltage, positive or negative, will be impressed on the respective positive or negative boost capacitor 35 or 36 through whichever of the respective positive or negative boost rectifiers 26-31 is forward biased. Through the coupling of the variable dc-dc transformer 22, the same voltage but of opposite polarity will be mirrored on the other respective negative or positive boost capacitor 36 or 35.

In the 3-phase pfc boost ac-dc power converter 20 of FIG. 2, there is a very simple measurement that can be made to ensure that the currents are correct and to adjust them if they are not. A three leg voltage divider 42 having three equal value resistors 43-45 is used to generate a current vector reference voltage Vcvr. In the 3-phase power converters of this invention, there is no connection to the neutral wire of the 3-phase input, and the voltage of a hard-wired power neutral is not suitable for control if there is imbalance in the phase voltages A, B and C.

The current vector reference voltage Vcvr represents the vector sum of the three phase voltages A, B and C. The vectors of the three phase currents iA, iB and iC must be proportional and in phase with the respective vectors of the three phase voltages A, B and C. If this is true, the voltage on the transformer center-tap Vct will equal the voltage on the current vector reference voltage Vcvr. If it is not, the magnitude of the difference indicates the magnitude of the current error, and the phase angle of the difference voltage indicates which phase currents iA, iB or iC are erroneous. Effective control of the currents keeps the error voltage small.)

Figure 3:
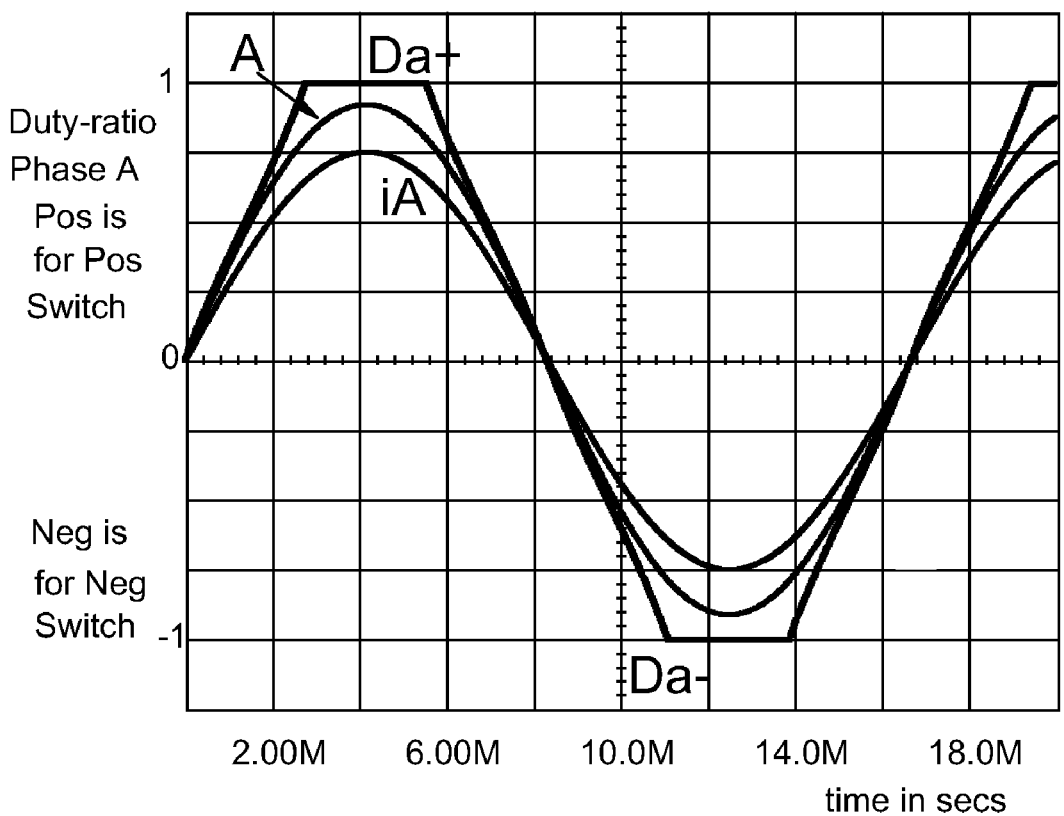
FIG. 3 shows the duty-ratio for the phase A switches of a 3-phase pfc 100% duty-ratio buck converter. The phase A voltage and current are also shown.

FIG. 3 shows the duty-ratio Da+ of the switch 4 of FIG. 1 and the duty-ratio Da− of the switch 7 of FIG. 1. The phase A voltage A and the phase A current iA are also shown, for reference. Note that Da+ is fixed at 1 when the phase A voltage is dominant and positive, and Da− is fixed at −1 when the phase A voltage is dominant and negative. A negative duty-ratio has no meaning; it designates a positive duty-ratio for a negative side switch.

Figure 4:
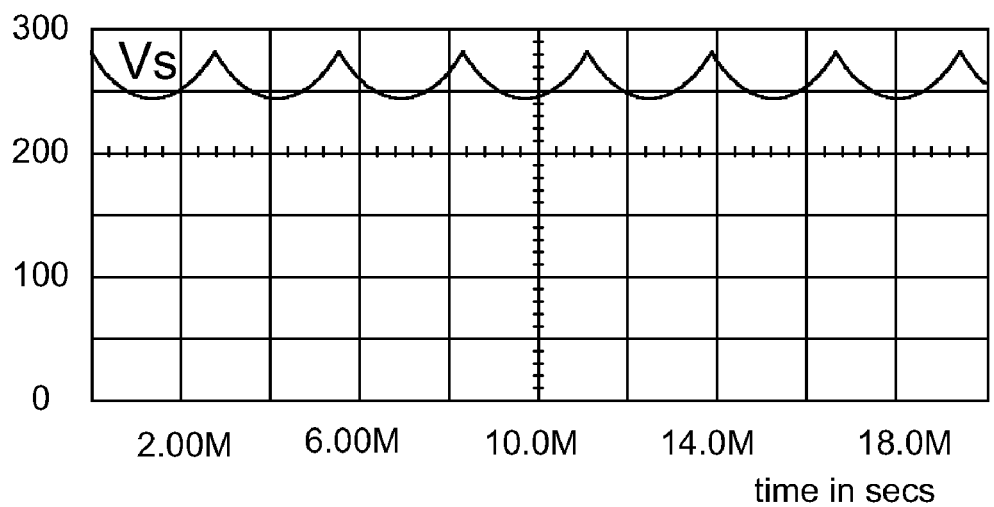
FIG. 4 shows the ripple voltage Vs, with reference to FIG. 1.

FIG. 4 shows the ripple interstage voltage Vs, with reference to FIG. 1. The voltage peaks as a consequence of the flat duty-ratio.

Figure 5:
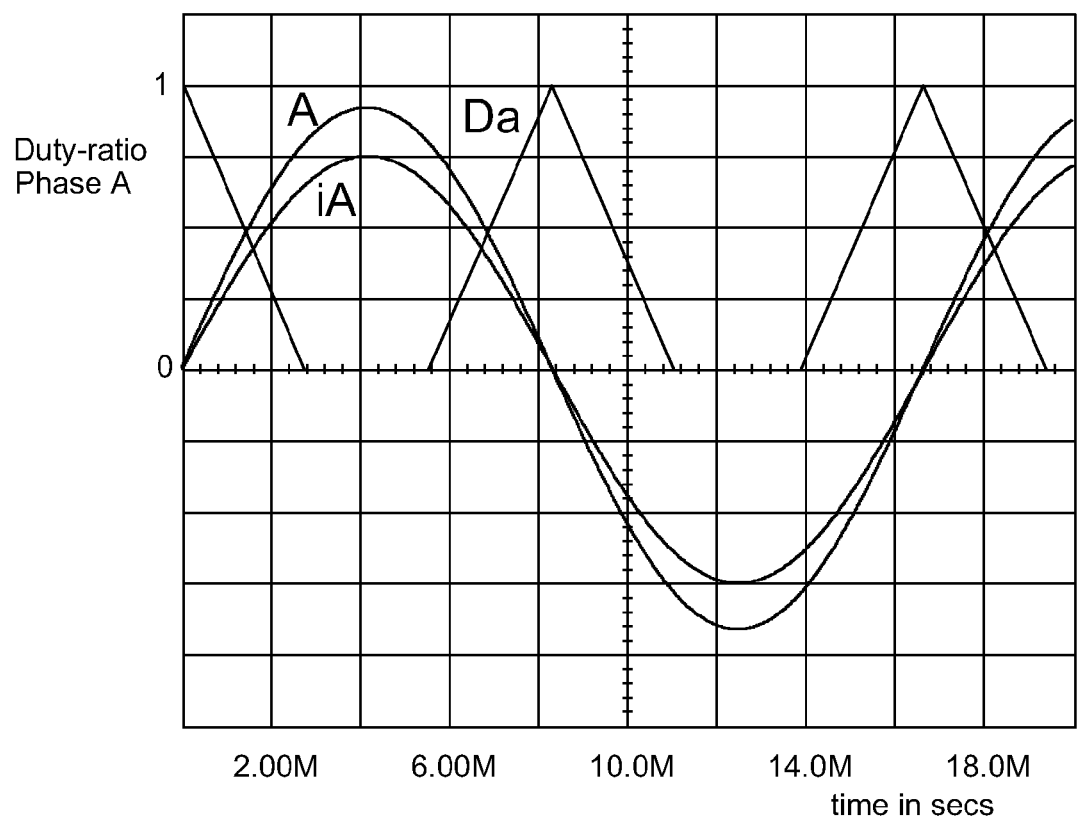
FIG. 5 shows the duty-ratio for the phase A switch of a 3-phase pfc 0% duty-ratio boost converter. The phase A voltage and current are also shown.

FIG. 5 shows the duty-ratio Da of the switch 32 of FIG. 2. The phase A voltage A and the phase A current iA are also shown for reference. Note that the duty-ratio is 0 whenever the phase A voltage A is dominant.

Figure 6:
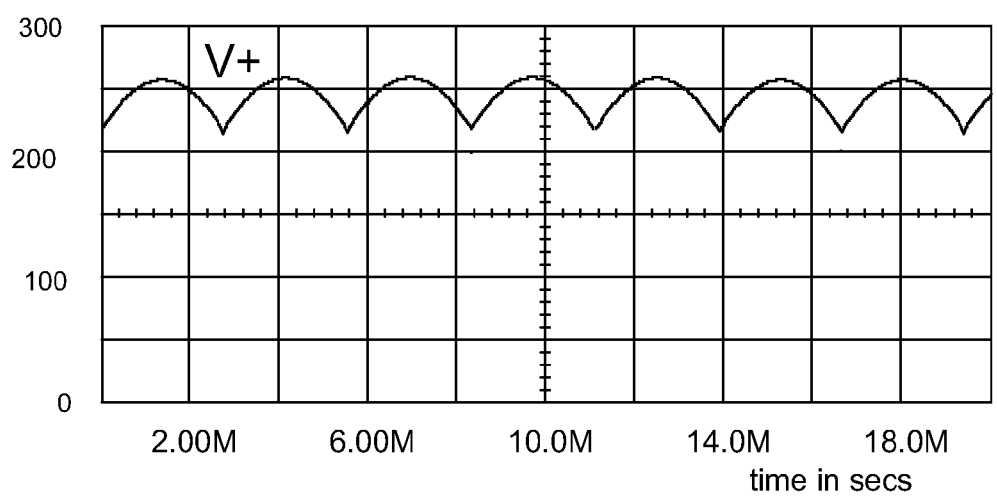
FIG. 6 shows the ripple voltage V+, with reference to FIG. 2.

FIG. 6 shows the interstage voltage V+ from FIG. 2. While the duty-ratio of any phase is 0, the peak voltage of that phase passes through unmodified, so the waveform V+ in FIG. 6 is the same as a full-wave rectified 3-phase voltage.

Figure 7:
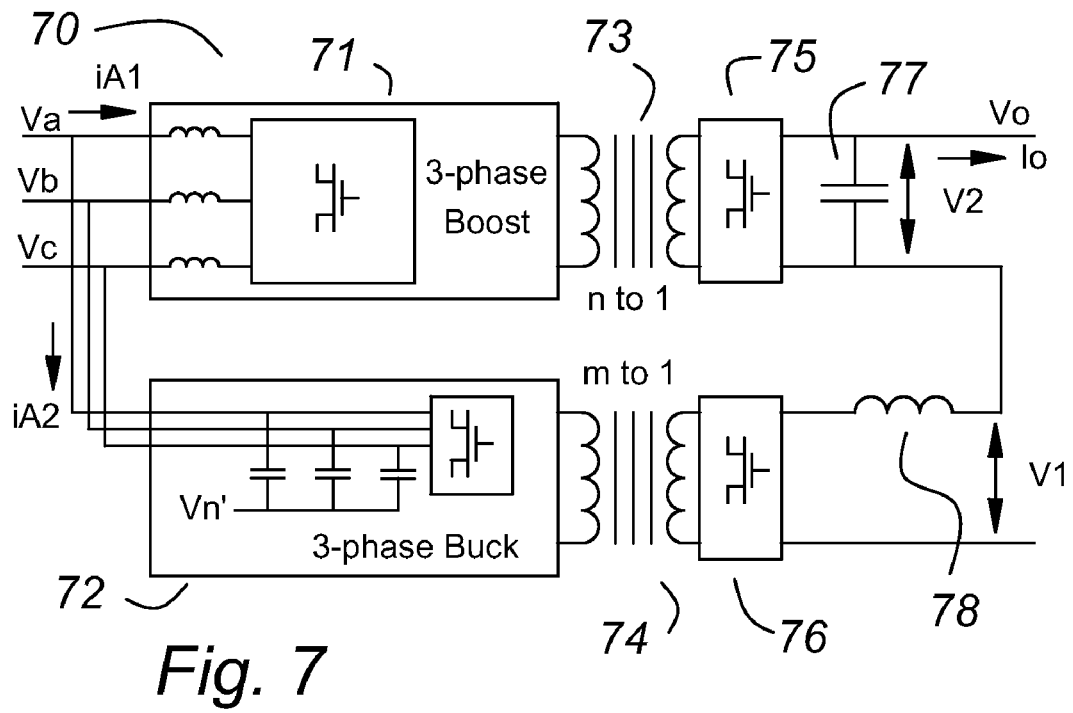
FIG. 7 shows a block diagram of a 3-phase boost converter and a 3-phase buck converter in parallel with their outputs in series.

Note that the waveforms Vs of FIG. 4 and V+ of FIG. 6 are approximately complementary, as further shown in 9. This suggests that if the voltages Vs and V+ were added, the ripple would be reduced in the sum. FIG. 7 shows a block diagram of a circuit to do this.

FIG. 7 shows a 3-phase pfc ac-dc power converter 70 comprising a 3-phase boost converter 71 in parallel with a 3-phase buck converter 72. The 3-phase boost converter 71 operates at 0% duty-ratio and has a fixed ratio output transformer 73 with synchronous rectifiers 75 and an output capacitor 76. The 3-phase buck converter 72 operates at 100% duty-ratio and has a fixed ratio output transformer 74 with synchronous rectifiers 76 and an output inductor 78. The outputs are in series, which causes their output voltages to add. Because the outputs are in series, their output currents are equal (assuming that the output capacitor 7 is small), which constrains their respective input currents.

Figure 8:
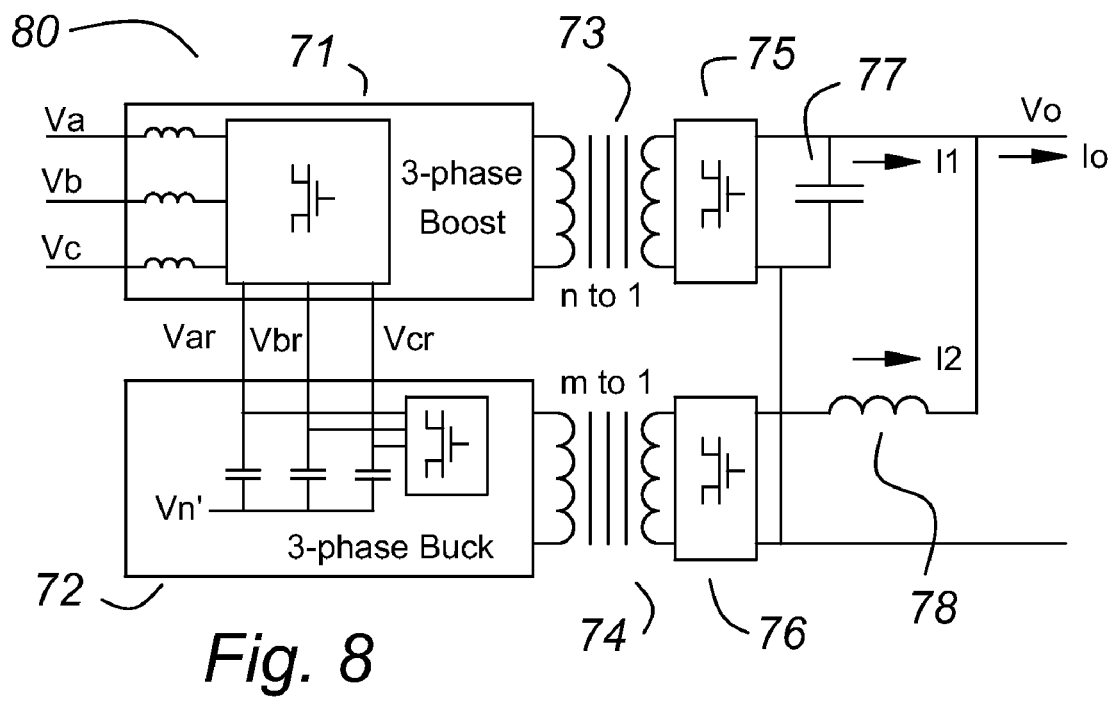
FIG. 8 shows a block diagram of a 3-phase boost converter and a 3-phase buck converter in series with their output paralleled.

FIG. 8 shows a 3-phase pfc ac-dc power converter 70 comprising a 3-phase boost converter 71 in series with a 3-phase buck converter 72. The 3-phase boost converter 71 operates at 0% duty-ratio and has a fixed ratio output transformer 73 with synchronous rectifiers 75 and an output capacitor 76. The 3-phase buck converter 72 operates at 100% duty-ratio and has a fixed ratio output transformer 74 with synchronous rectifiers 76 and an output inductor 78. The outputs are in parallel, which causes their output currents to add. Because the outputs are in parallel, their output voltages are equal (assuming that the output inductor 78 is small), which constrains their respective input voltages.

Figure 9:
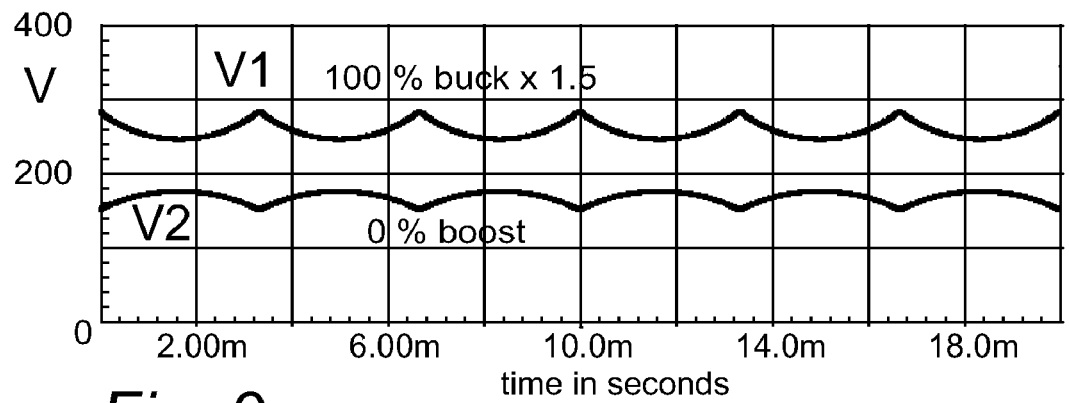
FIG. 9 shows the ripple voltages V1 and V2 for the buck and boost converter sections of FIG. 7.
Figure 10:
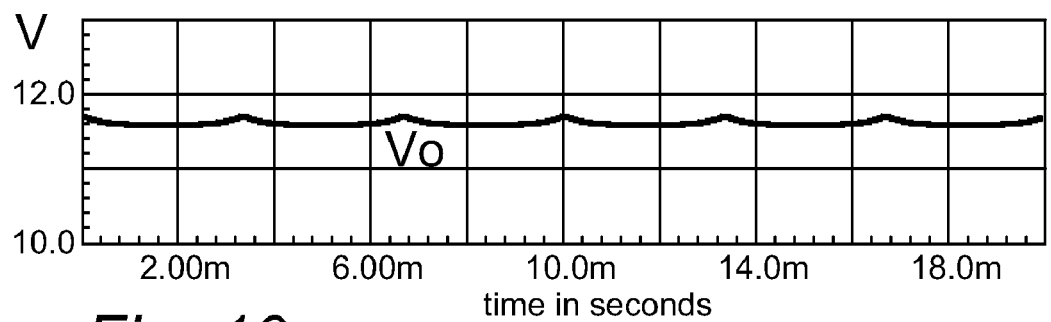
FIG. 10 shows that the ripple voltages nearly cancel at the output Vo.

FIG. 9 shows the ripple voltages V1 and V2 for the boost and buck converter sections 71 and 72 respectively of FIG. 7. FIG. 10 shows that the ripple voltages nearly cancel at the output Vo.

Figure 11:
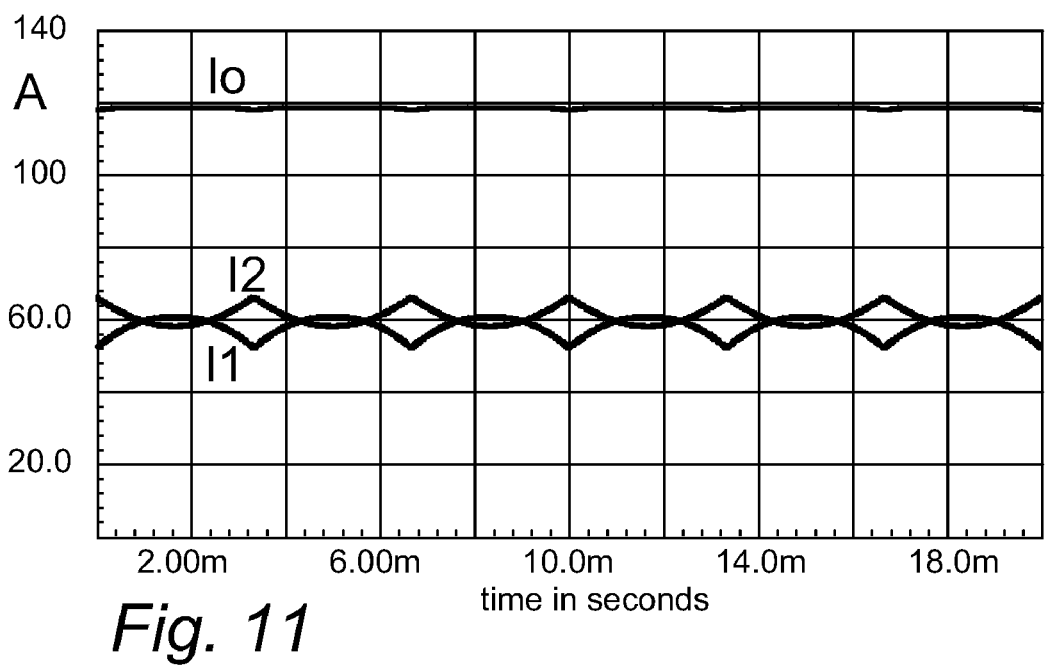
FIG. 11 shows the ripple currents I1 and I2 for the buck and boost converter sections of FIG. 8, and that they nearly cancel in the output current Io.

FIG. 11 shows the output currents I1 and I2 of the boost and buck converter sections 71 and 72, respectively, of FIG. 8, each of which has a significant ripple current, but the ripple currents are complementary and add to a reasonably clean dc current Io.

Figure 12:
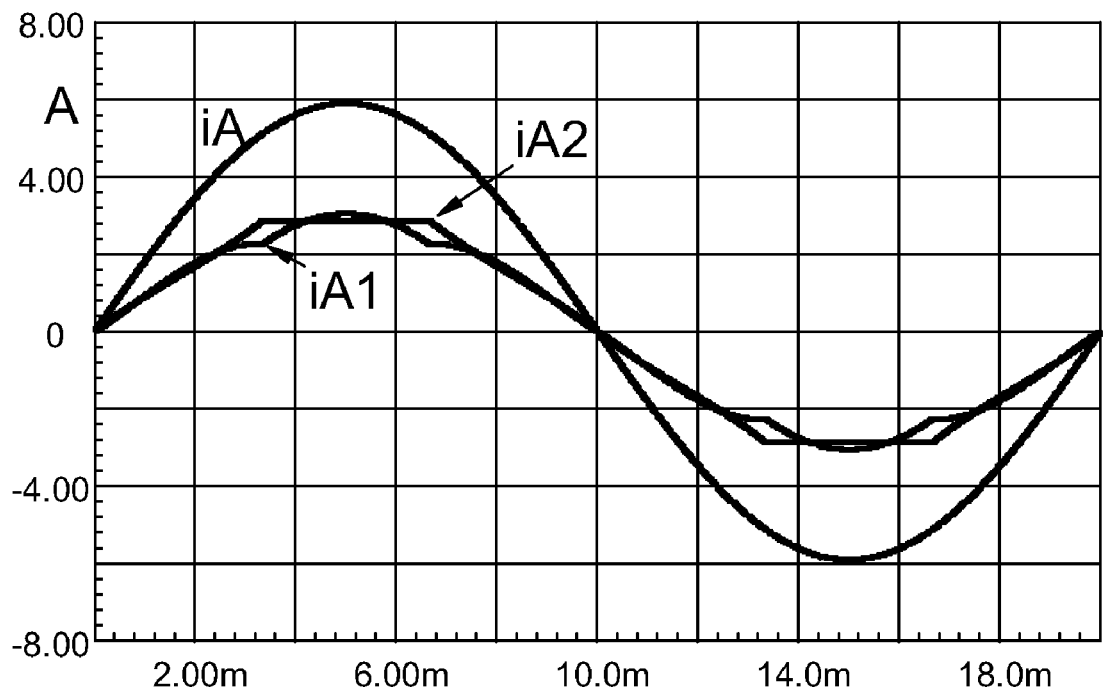
FIG. 12 shows the input currents iA1 and iA2 for phase A in the buck and boost sections of FIG. 7. Though each has a non-sinusoidal waveform, their sum is a clean sine wave, the input current iA.

FIG. 12 shows the phase A input currents for the 3-phase pfc ac-dc power converter 70 of FIG. 7. The output current Io is a constant dc current (at steady state conditions) that reflects to the respective inputs as the respective duty-ratios, resulting in the non-sinusoidal waveforms iA1 and iA2 shown in FIG. 12, being, respectively, the input currents of the 3-phase buck stage 72 and the 3-phase boost stage 71. Although the currents iA1 and iA2 are not sinusoidal, their sum is, and is the pfc input current iA.

Figure 13:
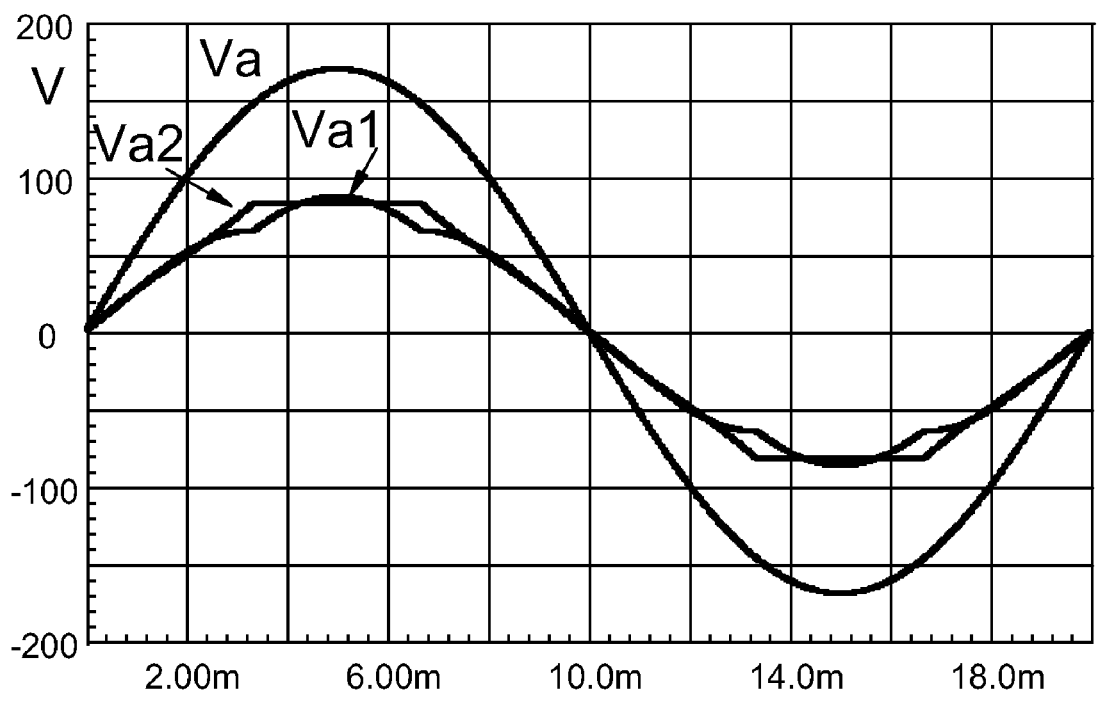
FIG. 13 shows the voltage Va1 and Va2 for phase A in the boost and buck sections of FIG. 8. Though each has a non-sinusoidal waveform, their sum is a clean sine wave, the input voltage Va.

FIG. 13 shows the phase A input voltages for the 3-phase pfc ac-dc power converter 80 of FIG. 8. The output voltage V0 is a constant dc voltage (at steady state conditions) that reflects to the respective inputs as the respective duty-ratios, resulting in the non-sinusoidal waveforms Va1 and Va2 shown in FIG. 13, being, respectively, the input voltages of the 3-phase buck stage 72 and the 3-phase boost stage 71. Although the voltages Va1 and Va2 are not sinusoidal, their sum is, and is the pfc input voltage Va. With reference to FIG. 8, Va1=Va−Var, and Va2=Var−Vn'.

Figure 14:
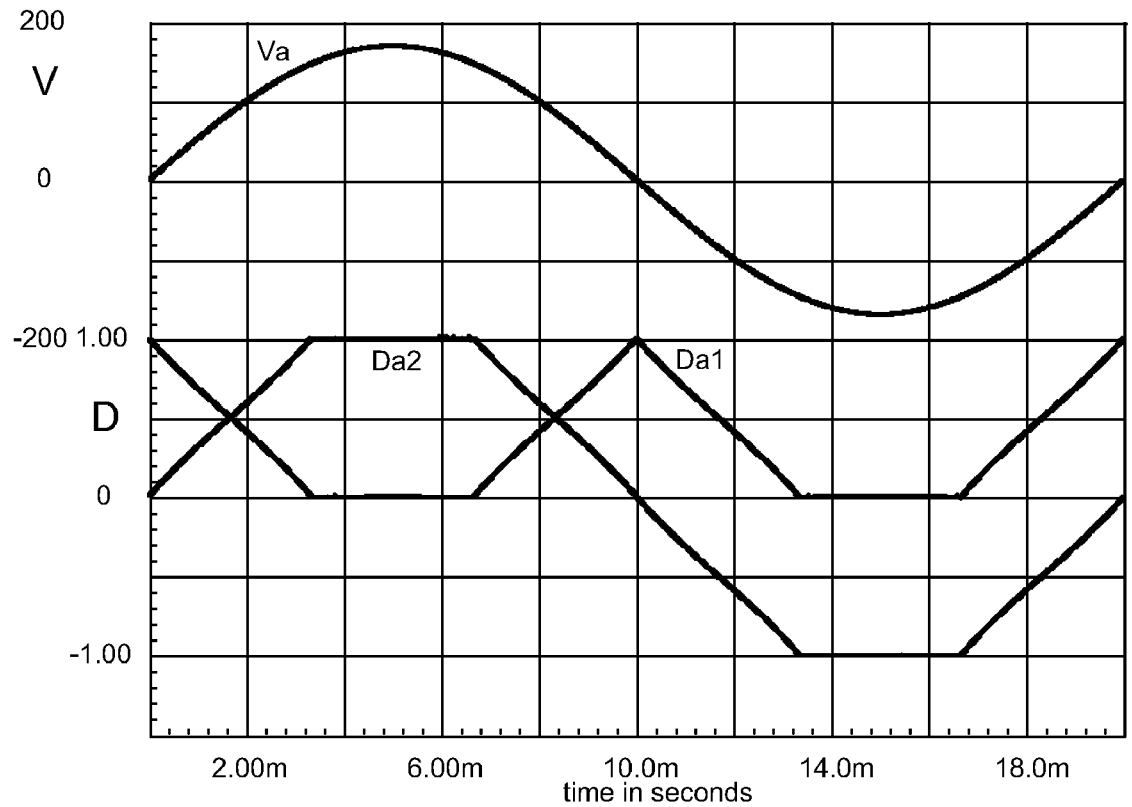
FIG. 14 shows the duty-ratio for the boost section, Da1 and the duty-ratio for the buck section, Da2 for the phase A switches. The phase A voltage Va is shown for reference. The 20 ms period shows that this is for 50 Hz.

FIG. 14 shows the duty-ratios for the 3-phase pfc ac-dc converter 70 of FIG. 7. This is similar to the waveforms in FIGS. 3 and 5, confirming that the duty-ratios are not changed when the 3-phase buck and boost stages are used in parallel-series or series-parallel combinations as shown in FIGS. 7 and 8.

Figure 15:
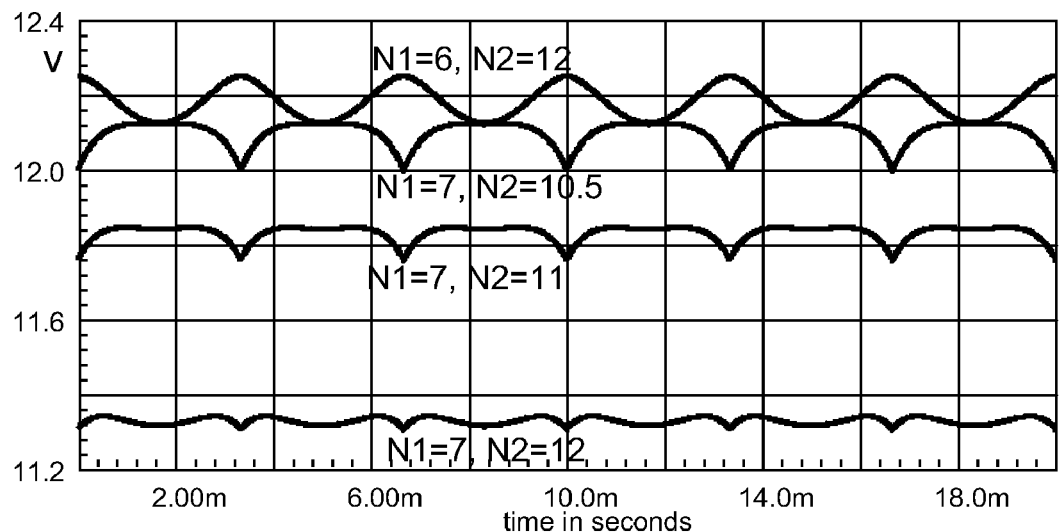
FIG. 15 shows the ripple cancellation for various transformer ratios.

As background for FIG. 15, note that the voltage Vs in FIG. 4 is not equal to the voltage V+ in FIG. 6. Making the ripple voltage components nearly equal so that they are nearly cancelled when the voltage are added requires different ratios in the output transformers 73 and 74, with reference to FIG. 7. FIG. 15 shows the resulting output voltages for several different transformer ratio combinations. The equations suggest that the respective turns ratios should differ by a factor of 1.5, for example, N1=7 and N2=10.5, but this is based upon the solution when the voltage is at its peak and it is not optimum over the whole cycle. Trying different ratio combinations in SPICE shows that many different ratios can be used, which is fortunate as transformer turns ratios are constrained to be whole numbers if conventional transformers are used. (Matrix transformers have different constraints and can be used to produce fractional turns ratios.) N1=7 and N2=12 actually produced the lowest overall voltage ripple.

As will be explained below, the voltage can be adjusted upward somewhat, and the ripple can be eliminated, by tweaking the duty-ratios of the non-dominant phases in the boost converter stage. For a 12 V output, N1=7 and N2=11 may be the best choice, as it produces an output voltage that is slightly below 12 V and needs little boost to make it an accurate 12.0 V dc with minimal ripple.

In a boost converter, increasing the duty-ratio increases the output voltage, as would be well known to one skilled in the art of power converters. The duty-ratio in a boost converter controls the average voltage across an inductor. For steady-state operation, the average voltage on the output of the inductor equals the input voltage. In the case of a pfc power converter, the switching frequency is much greater than the line frequency, so the input voltage is changing comparatively very slowly so the duty-ratio varies very little from switching cycle to switching cycle. A slight decrease in the average voltage relative to the input voltage causes the input current to increase and a slight increase in the average voltage relative to the input voltage causes the input current to decrease.

In the 3-phase pfc boost converter of FIG. 2, the dominant phase switch has a duty-ratio of 0%, that is, it is open all of the time. For discussion, consider that phase A is dominant and switch 32 is open continuously. For normal operation, feedback senses any difference between Vct and Vcvr and adjusts the duty-ratio of the non-dominant phases slightly to correct any errors. The difference voltage between Vct and Vcvr is a vector. Its magnitude indicates the error and its phase indicates which current needs to be adjusted. Accordingly, the voltage difference between V+ and Vct equals the voltage difference between A and Vcvr. The difference between Vct and V− is the same, constrained by the transformer primary winding 37.

When phase A is dominant, both phase B and phase C have lower magnitude and are of opposite polarity. Having lower voltage magnitudes, the duty-ratios of their switches are higher. By algorithm, the sum of their duty-ratios equals 100%, but that can be varied to adjust the currents and/or voltage. A differential adjustment (one up, one down) causes a rebalancing of the phase currents. A common mode adjustment (both up or both down) adjusts the current in both non-dominant phases to adjust the total current. An increase in the duty-ratio will cause both currents to increase, which in turn increases the voltage on V−. This causes Vct and Vcvr to differ, but that difference can be purposefully, caused by feedback as a way of adjusting the voltage.

Figure 16:
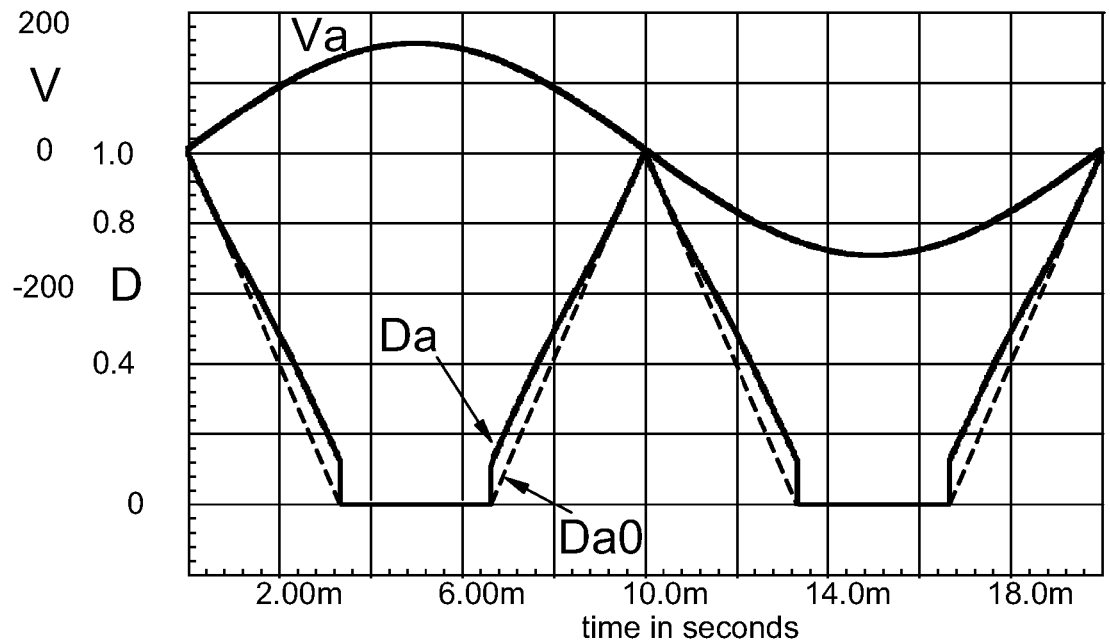
FIG. 16 shows the duty-ratio for the boost section with voltage regulation of the non-dominant phases only. The duty-ratio of phase A is 0 when phase A is the dominant phase, but the actual duty-ratio Da varies slightly from the strictly formulaic duty-ratio Da0.

FIG. 16 shows the duty-ratio of phase A adjusted to increase the output voltage. Da0 is the normal duty-ratio with no voltage adjustment and Da is the adjusted duty-ratio. Note that it remains at 0% when phase A is dominant, but it is increased slightly when phase A is not dominant. Da can be adjusted up or down, with the constraint that it can never be less than 0% nor greater than 100% (shown as the equivalent 0 and 1.0 on the graph).

Figure 17:
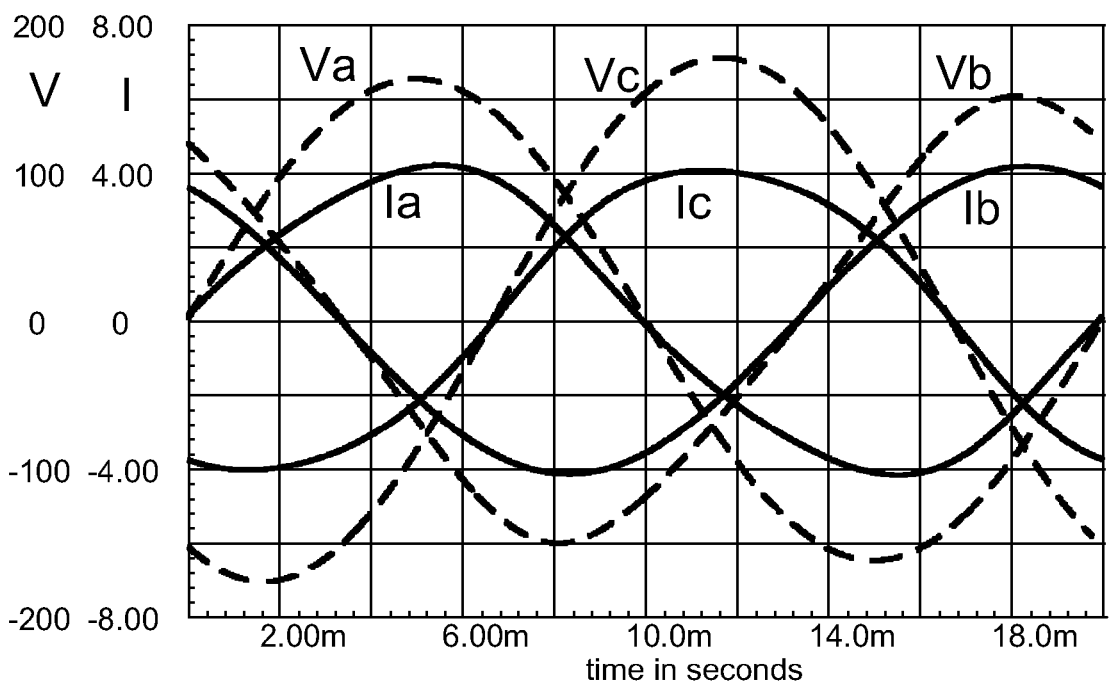
FIG. 17 shows that by using a control algorithm based upon the current vector reference Vcvr (see FIG. 2), the phase currents are well balanced even if the phase voltages are not.

FIG. 17 shows that the three phase currents Ia, Ib and Ic are nearly equal despite large differences in the three phase voltages Va, Vb and Vc. The current waveforms are somewhat lumpy, but the currents Ia, Ib and Ic are in balance and nearly equal. Specifically, $\Sigma I=0$. This is achieved using the current vector reference voltage Vcvr for control, as explained above.

Figure 18:
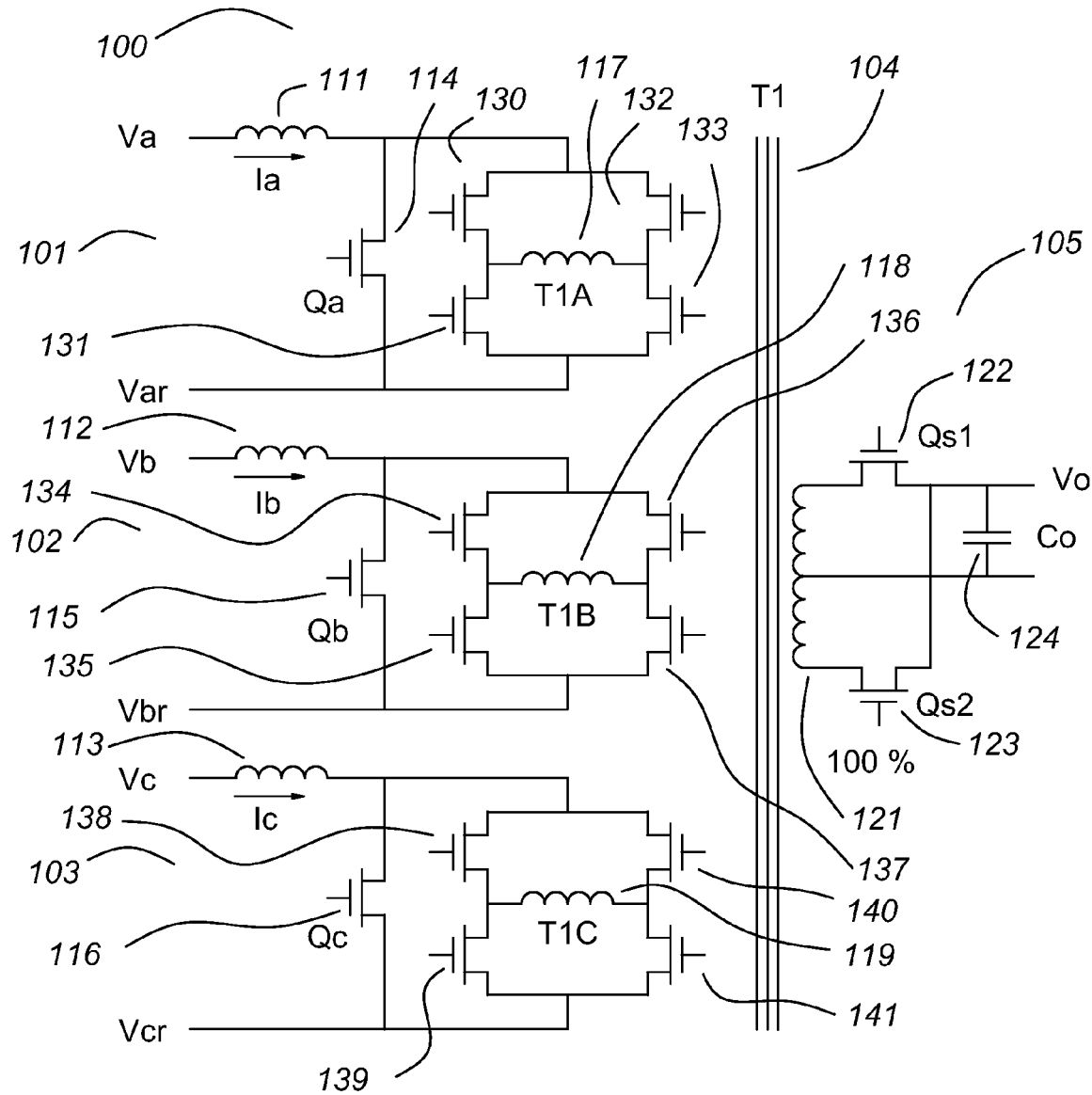
FIG. 18 shows an example of a boost stage. The transformer primaries are isolated, but all "see" the same voltage reflected from Vo.

FIG. 18 shows a 3-phase pfc ac-dc boost converter stage 100 that may be the 3-phase pfc ac-dc boost converter stage 71 of FIG. 8. There are three boost switch primary circuits 101-103, one for each phase, a common transformer 104 with three primary windings 117-119 and a secondary circuit 105 comprising a secondary winding 121, synchronous rectifiers 122 and 123 and an output capacitor 124.

The boost switch primary circuits comprise inductors 111-113 and may include optional boost switches 114-116. The three transformer primary windings 117-119 are excited by full-bridge switches 130-141. Within each boost switch primary circuit, the phasing of the full-bridge switches 130-141 relative to the phasing of the synchronous rectifiers 122 and 123 determines the polarity of the voltage seen by the inductors 111-113.

Because it is contemplated to use this 3-phase boost stage in series with a 3-phase buck stage on the voltage input side, as shown in FIG. 8, the circuits for the three phases are isolated from each other. However, as in the 3-phase boost converter of FIG. 2, there must be a common boost voltage for the inductors and switches of each phase. This is accomplished using the transformer 104. Its secondary winding 121 has synchronous rectifiers 122 and 123 operating at 100% duty-ratio, so the voltage V0 on the output capacitor Co reflects to the primary windings 117-119 for each phase.

For the dominant phase, phase A for example, the duty-ratio is 0%, for normal operation, so the optional boost switch 114 remains off and the full-bridge switches 130-133 operate at 100% duty-ratio. Accordingly, the voltage Va will reflect to the secondary voltage V0 and the output capacitor Co as a rectified voltage, the polarity being determined by the relative phasing of the full-bridge switches 130-133 and the synchronous rectifiers 122 and 123. The phasing is reversed whenever any of the input voltages Va, Vb or Vc is negative so that Vo is always positive. Vo has the waveform of a full-wave rectified 3-phase voltage as in FIG. 6, with the voltage magnitude being determined by the voltage magnitude of the input voltages Va, Vb and Vc and the turns ratio of the transformer 104.

The non-dominant phases have duty-ratios that are greater than 0%. If the optional boost switches 114-116 are used, they are turned on when appropriate and the associated full-bridge switches 130-141 are turned off so that the associated primary windings 117-119 are not short-circuited.

Alternatively, the optional boost switches 114-116 can be eliminated, and the inductors 111-113 can be shorted by turning on two bridge switches 130-141 on the same side of the associated bridge circuit. For example, to short the inductor 112 of the phase B primary boost circuit 102, the bridge switches 134 and 135 may be turned on. So that the primary winding 118 is not short circuited, the bridge switches 136 and 137 are turned off. At the end of the pulse, normal bridge switching is resumed for the duration of the switching cycle.

The optional boost switches 114-116 are for increased efficiency, particularly if the maximum input voltage is well controlled. To short the inductor using the full-bridge switches 130-141, two switches on the same side of a bridge network must be turned on, for example, full-bridge switches 130 and 131. The current passes through two ac switches. By using the optional boost switches 114-116, the current passes through one ac switch. The use of both methods at the same time is also possible.

As taught in U.S. Pat. No. 7,633,782 and in the discussion of FIG. 16, the duty-ratios of the non-dominant phases can be tweaked to adjust the voltage slightly, for example, not a limitation, to reduce ripple and load regulation. Under low line conditions, the duty-ratio of all of the phases can be increased to boost the output voltage. This mode of operation is less efficient, but if low line transients are infrequent and of short duration, the reduced efficiency is of little consequence.

In this specification and the claims, a boost converter recited as having "0% duty-ratio" includes operation at increased duty-ratio to limit under-voltage transients.

Because the full-bridge switches 130-141 operate with both polarities of input voltage, they must comprise ac switches. An ac switch is a switch that can block voltage of either polarity when off and conduct current in either direction when on. Back-to-back MOSFETs are an ac switch, as an example, not a limitation. Other familiar ac switches include a dc switch inside a full-wave rectifier bridge, and parallel IGBTs or parallel transistors with blocking diodes as required.

Note that the 3-phase pfc ac-dc boost converter stage 100 may be used without a buck stage by connecting Var, Vbr and Vcr together as a common point Vct, using FIG. 2 as a model. When operated at 0% duty-ratio, the output will have ripple as in FIG. 6, so it is preferably used with a modulator such as a variable dc-dc transformer. This can be achieved by using a variable dc-dc transformer in the place of the fixed ratio transformer 104.

Note that the 3-phase pfc ac-dc boost converter stage 100, having isolated primary circuits, may be also be used Δ-connected, with appropriate control circuits.

Figure 19:
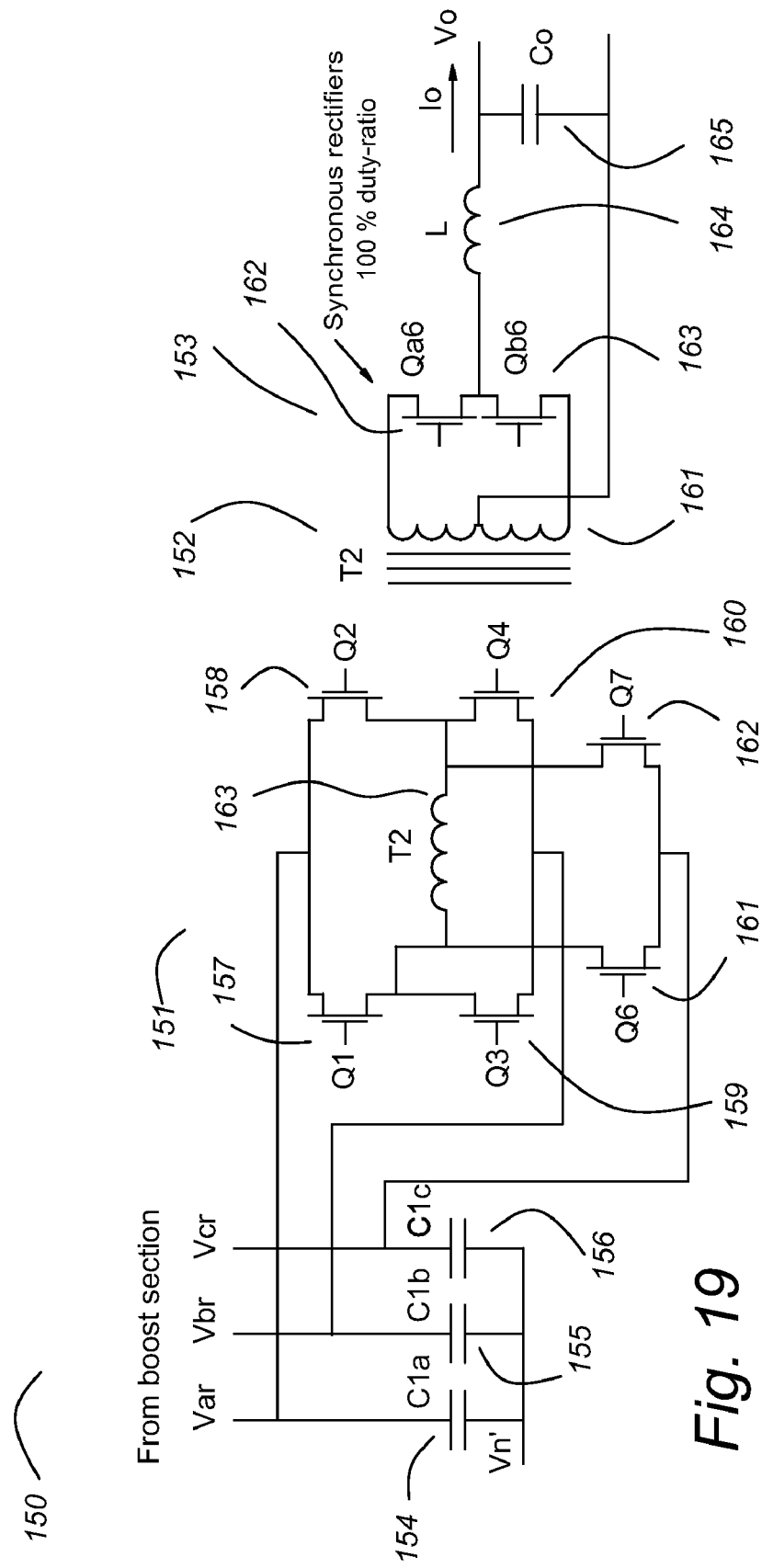
FIG. 19 shows an example of a buck stage. Vn' is a virtual neutral and is NOT connected to the voltage source neutral.

FIG. 19 shows a 3-phase pfc 100% duty-ratio buck converter 150, which may be the 3-phase pfc 100% duty-ratio buck converter 72 of FIGS. 7 and 8. The 3-phase pfc 100% buck converter 150 may be used alone with a post modulator as shown in FIG. 1 and as taught in U.S. Pat. No. 7,633,782, but FIG. 19 contemplates its being used with a 0% duty-ratio boost converter as shown in FIG. 8. It may also be used in parallel with a 0% boost converter as shown in FIG. 7, in which case the input voltages Var, Vbr and Vcr are replaced with the three phase input voltages Va, Vb and Vc.

The 3-phase pfc 100% duty-ratio buck converter 150 comprises a primary switching circuit 151, a transformer 152 and a secondary circuit 153 comprising synchronous rectifiers 162 and 163, an inductor 164 and an output capacitor 165.

The primary switching circuit 151 comprises six switches 157-162 shown as MOSFETs, as an example, not a limitation. Because the input voltages Var, Vbr and Vcr alternate polarity, the switches 157-162 must comprise ac switches. An ac switch is a switch that can block voltage of either polarity when off and conduct current in either direction when on. Back-to-back MOSFETs are an ac switch, as an example, not a limitation. Other familiar ac switches include a dc switch inside a full-wave rectifier bridge, and parallel IGBTs or parallel transistors with blocking diodes as required.

Operation for the case of phase A being dominant and positive is described. One skilled in the art of power converters will understand how to extend this example to the remainder of the line frequency cycle. The output current Io is determined by the output voltage and the load. When both the 0% boost converter and the 100% buck converter are operating by algorithm alone (no feed back), the output voltage is not regulated but will be linearly proportional to the magnitude of the input voltages. The discussion of FIG. 16 and U.S. Pat. No. 7,633,782 teaches that the 0% boost converter can make small adjustments to the output voltage by tweaking the duty-ratios of the non-dominant phases to reduce ripple voltage and for load regulation. In either scenario, the 100% buck converter operates at 100% duty-ratio for normal operation, that is, it does not vary its modulation algorithm for voltage or output current control.

100% duty-ratio cannot be literally true for all three phases. It is defined as having 100% duty-ratio for the dominant phase, that is, the phase having the highest voltage magnitude, negative or positive, and as the sum of the duty-ratios of the non-dominant phases equaling 100%. The duty-ratio for the phase A switches of a 3-phase 100% duty-ratio buck converter is shown in FIG. 3.

Expressed as equations, the duty-ratios for a 3-phase 100% duty-ratio buck converter are:

$$Da = \frac{\text{Sin}X}{\max\{|\text{Sin}X|, |\text{Sin}(X+120)|, |\text{Sin}(X+240)|\}}$$

$$Db = \frac{\text{Sin}(X+120)}{\max\{|\text{Sin}X|, |\text{Sin}(X+120)|, |\text{Sin}(X+240)|\}}$$

$$Dc = \frac{\text{Sin}(X+240)}{\max\{|\text{Sin}X|, |\text{Sin}(X+120)|, |\text{Sin}(X+240)|\}}$$

In a practical converter, the sine functions are derived from the phase voltages, preferably referenced to a current vector reference voltage Vcvr as shown in FIG. 2.

The duty-ratio can be varied from normal to limit overvoltage transients by reducing each duty-ratio by a common factor, synchronized so that during the off time, all of the switches 157-162 are off. Under this scenario, the synchronous rectifiers 162 and 163 preferably are both turned on for the duration of the off time and will function as a catch rectifier for the inductor 164. This mode of operation is less efficient, but if high line transients are infrequent and of short duration, the reduced efficiency is of little consequence. A more serious consequence of designing for this mode of operation is that higher voltage rated parts must be used, which may adversely affect efficiency for all modes of operation.

In this specification and the claims, a buck converter recited as having "100% duty-ratio" includes operation at reduced duty-ratio to limit over-voltage transients.

Returning to our example of normal operation with phase A dominant and positive, the switches 157 and 158 operate at 100% duty-ratio, that is 50%-50% synchronously with the synchronous rectifiers 162 and 163 so that the inductor current Io reflects to the primary as a dc current determined by the output current Io and the turns ratio of the transformer 152.

During the time that phase A is dominant, one and only one of the switches 159-162 is on at a given instant. As with the switches 157 and 158, the switching is synchronous with the synchronous rectifiers 162 and 163. The duty-ratio Db of the switches 159 and 160 and the duty-ratio Dc of the switches 161 and 162 totals 100% but there is no gap or overlap. In a full-wave bridge circuit, having the wrong switches turned on at the same time short circuits the input, a condition that cannot be allowed. Accordingly, there may be a very short off-time to prevent shoot-through, but it must be minimal so that the reflected inductor current Io is not interrupted more than necessary.

Input capacitors 154-156 are needed as the input currents and the currents in the 100% buck converter will vary over the switching cycle. The capacitors 154-156 are preferably small, sized to smooth the current at the switching frequency but have no significant energy storage at line frequency.

The 3-phase pfc 100% duty-ratio buck converter 150 may also be used alone. If operated at 100% duty-ratio, the output voltage has ripple as in FIG. 4, so a post modulator is needed, as in FIG. 1. A variable dc-dc transformer can be substituted for the fixed ratio transformer 152 for this purpose.

FIG. 20 shows a block diagram of an analog control circuit 200 that is suitable for controlling 3-phase pfc ac-dc power converter of this invention. FIG. 21 shows the important timing relationships. It is contemplated that a modern control circuit may use a digital processor and include many other functions such as built in test, as an example, not a limitation, but discussing the analog control helps to illustrate the relationship among the signals.

The control circuit 200 comprises an integrator 201, a comparator logic section 202 and feedback control circuit 203. In the integrator 201, a charging current through a resistor 210 charges a capacitor 211 to produce a positive ramp voltage as shown in the small diagram 216 and at the top graph of FIG. 21.

Six comparators 204 to 209 switch state when their respective inputs equal the voltage of the charging ramp. The intercept is shown in the top graph of FIG. 21, with the resulting duty-ratios shown in the second graph of FIG. 21. Note that some of the curves in the second graph of FIG. 21 require additional logic, not shown.

Input reference voltages |Va|, |Vb|, and |Vc| to the comparators 204-209 are derived from the three phase voltages. Other circuits, not shown, measure the voltages from the inputs to the current vector reference voltage Vcvr (with reference to FIG. 2) and then rectify them precisely. The reference voltages |Va|, |Vb|, and |Vc| to the comparators 207-209 have series resistors 213-215 so that the feedback control circuit 203 may inject a signal to compensate for error. In a practical control circuit there may be more comparators with more resistors so that different duty-ratios can be modified. The control is not a point of novelty, and the simpler example illustrates the points needed to understand the operation of the invention. One skilled in the art of analog design would be able to make a practical control circuit without undue experimentation.

The integrator is reset by a switch 212 at regular intervals by a reset pulse as shown by the small diagram 217. As an example, not a limitation, the reset signal may be generated by an AND gate, not shown, with its inputs being Da1, Db1 and Dc1, so that the integrator immediately resets synchronously with the longest duty-ratio, effectively making it essentially continuous as shown for Da1 in FIG. 21.

Note that the charging current is derived from a signal Max(|Va|, |Vb|, |Vc|), derived from Va, Vb and Vc by analog circuits that are not shown. A signal at this node alters the charging rate of the capacitor 211 inversely to the voltage, so it is a divisor. The intercept with the charging rate, for example, |Va| increases as the voltage, so it is a multiplicand. While phase A is dominant, this reduces to |Va|/|Va|=1, the duty-ratio for the dominant phase. Because the charging rate and the intercept voltage are changing by the same amount, the period is essentially constant.

In FIGS. 20 and 21, the pulses suffixed 1 are for the 100% duty-ratio buck converter and the pulses suffixed 2 are for the 0% duty-ratio boost converter. Note the pulses Db1 and Dc1. Db1 has the correct pulse-width, but its timing is wrong, therefore Db'1 is defined as NOT Dc1, consistent with the sum of the duty-ratios of the non-dominant phases equaling 100%. This is less important for the boost timing, Da2, Db2 and Dc2, still it is preferred to define Db'2 using the inverse logic of Dc2. However, both of the non-dominant duty-ratios must be tweaked to maintain current balance and, optionally, to reduce ripple and load regulation. That is Dc2 and Db'2 must have provision for adjustment in response to feedback as shown by the arrows in the curves for Dc2 and Db'2. The arrows exaggerate the range of adjustment needed—they are sized to be easily visible.

Reciprocity: Any of the 3-phase pfc power converters of this invention can be operated in reverse as a dc-ac converters because the circuits are reciprocal. The switches must be designed for the reversed current flow. In this specification and the claims, a recitation of a circuit operating in the forward direction includes its reciprocal operating in the reverse directions including any modifications necessary for reversed current flow in the circuit and its control. Also, an ac-dc converter can be joined with a dc-ac converter to make an ac-ac converter.

Soft start: Because 3-phase power transfer is continuous, equivalent to dc, the 3-phase pfc ac-dc converter can start "instantaneously" at any time just by applying the natural modulation algorithm appropriate for the state of the input voltages. However, for many applications, a soft start is preferred.

Soft start is possible, six times per ac cycle, when the line to line voltage of any two phases is 0 V. At one of these events, the circuit begins operating with these two phases only, 0% duty-ratio in the boost stage and 100% duty-ratio in the buck stage. The output voltage will rise as the line-to-line voltage rises.

The line-to-line voltage increases and reaches maximum in 90°, 5 ms at 50 Hz and 4.2 ms for 60 Hz. At that point, the third phase voltage is equal to zero, and from that time, normal operation begins and the output voltage is regulated.

Soft stop is similar, except reversed. With pfc, the voltage and current are in phase, so turn-off at zero volts is also zero current, but if there is any phase difference for some reason, use the zero current point. When one of the phase currents is zero, turn it off. When the line to line current of the remaining two phases is zero, turn them off.

The Algorithms

Once the algorithms are well understood, they can be optimized for maximum efficiency.

The following signals are needed for the control algorithm:

Va, Vb, Vc, all referred to Vcvr. They are easily generated with operational amplifiers or A/D converters.

Va>0, Vb>0 and Vc>0, easily generated with comparators.

|Va|, |Vb| and |Vc|, the absolute values, are easily generated with operational amplifiers or digitally.

Comparators determine |Va|>|Vb|; |Vb|>|Vc|; and |Vc|>|Va|, and logic ranks them to determine the dominant phase, the intermediate phase and the lowest magnitude phase.

Max(|Va|, |Vb|, |Vc|). This is the full-wave rectified three phase voltage, easily generated with operational amplifiers or digitally.

There are many ways to implement the required duty-ratios, but the following protocol is suggested for normal operation.

1. The duty-ratios of the dominant phase are determined by comparators and logic alone using the voltage magnitudes. This ensures no glitches.

2. The duty-ratio of the least dominant phase (lowest voltage magnitude) is determined using the control algorithm.

3. The duty-ratio of the intermediate phase is the time remaining in the switching cycle following the duty-ratio of the least dominant phase. This minimizes glitches.

The Algorithm for the 100% Buck Converter

The buck stage of the 3-phase pfc ac-dc converter is derived from the familiar 3-phase pfc ac-dc buck converter in which all three phases are modulated to produce a regulated dc output voltage. For pfc with a regulated dc output voltage, each phase of the ac input current must be sinusoidal. Positive and negative buck switches on each phase have sinusoidal duty-ratios of $$Da = K \sin X$$

$$Db = K \sin(X+120)$$

$$Dc = K \sin(X+240)$$

K is a gain constant and X is the phase angle of the ac voltage. A negative solution is a positive duty-ratio for a negative-side switch. The dominant (highest magnitude) phase is of opposite polarity to the other two phases.

For improved efficiency with a dc output, K=1. At the peak voltage, the duty-ratio is 1, but for other points, the duty-ratio is less than 1. The active switches must therefore pulse-width-modulate at all points over the ac cycle. K can be reduced for over-voltage transients, and it can be controlled by feedback so that the output voltage is precise.

The duty-ratios cannot be greater than 1, so the design must ensure that K is <1 for any anticipated input voltage. To have a regulated voltage over a range of input voltages, such a 3-phase pfc ac-dc converter must be designed for the lowest voltage, which significantly compromises efficiency at nominal voltage because of the low duty-ratio.

A novel operating mode provides much higher efficiency. The duty-ratio of each phase is constrained to be on continuously (duty-ratio=1) for ⅓ of the ac cycle, the time that the phase is at maximum magnitude, or "dominant".

From above, $$Da = K*\sin(X)$$

For maximum efficiency, let K=1/sin X.

$$Da = 1$$

This equation for Da is valid for $$60° < X < 120° \text{ and } 240° < X < 300°.$$

For all phase angles, $$K = 1 / \max\{|\sin X|, |\sin(X+120)|, |\sin(X+240)|\} \text{ giving:}$$

$$Da = \frac{\sin X}{\max\{|\sin X|, |\sin(X+120)|, |\sin(X+240)|\}}$$

$$Db = \frac{\sin(X+120)}{\max\{|\sin X|, |\sin(X+120)|, |\sin(X+240)|\}}$$

$$Dc = \frac{\sin(X+240)}{\max\{|\sin X|, |\sin(X+120)|, |\sin(X+240)|\}}$$

The hairy-looking equations are actually very easy to derive for control as the ratio of the phase voltages to the full-wave rectified voltage:

$$Da = \frac{Va}{\max\{|Va|, |Vb|, |Vc|\}}$$

$$Db = \frac{Vb}{\max\{|Va|, |Vb|, |Vc|\}}$$

$$Dc = \frac{Vc}{\max\{|Va|, |Vb|, |Vc|\}}$$

This is because the voltage magnitude terms appear in both the numerator and denominator, cancelling, leaving the sine terms.

The equations above are for balanced phase voltages. With unbalanced input phase voltages, the equations are more complex, but the net effect is similar. Given the power of SPICE simulation, it is fairly easy to model the circuit and apply variables such as phase imbalance. The results are easily visualized, unlike with a hairy equation, and the likelihood of making errors in a complicated derivation is avoided.

Using natural modulation alone (control by algorithm alone, with no feedback) the output voltage is determined but is not regulated and will track the input voltage linearly. It has a six times line frequency ripple of about 15%, as shown in FIG. 4.

The equation for the output voltage is $$Vo1 = \frac{3*\sqrt{2}*Vi}{2*\max\{|\sin X|, |\sin(X+120)|, |\sin(X+240)|\}}$$

(factored by the transformer turns-ratio).

If applied to a resistive load, the output of the 100% duty-ratio 3-phase buck circuit alone would have a horrible input current wave-form. However, if the output is in series with any power modulator that regulates the output voltage to be a dc voltage, pfc is assured. A power modulator is any circuit for adjusting the output voltage in which the input power equals the output power. A 0% duty-ratio 3-phase pfc ac-dc boost converter is the preferred series circuit.

The Algorithm for the 0% Boost Converter

A similar optimization leads to the duty-ratio equations for the boost stage.

$$Da = 1 - \frac{|\sin X|}{\max\{|\sin X|, |\sin(X+120)|, |\sin(X+240)|\}}$$

$$Db = 1 - \frac{|\sin(X+120)|}{\max\{|\sin X|, |\sin(X+120)|, |\sin(X+240)|\}}$$

$$Dc = 1 - \frac{|\sin(X+240)|}{\max\{|\sin X|, |\sin(X+120)|, |\sin(X+240)|\}}$$

In the boost converter, the duty-ratios control the voltages reflected to the inputs such that the average voltages on the load side of the input inductors equals the source voltages. The current is controlled by permitting a small difference average voltage across the inductors so that the inductor current ramps up or down. Even small errors in the voltage can result in very large errors in the current over time, so control by feedback is required for accuracy and stability.

When a phase is dominant, the equation for its duty-ratio equals 0. The duty-ratios of the non-dominant phases are modulated to control the currents and the output voltage precisely.

Note the similarity to the buck stage equations. The nominal duty-ratios can be generated with the same basic circuit. The duty-ratios are then adjusted slightly by summing in an error signal using feedback.

The output voltage of the 0% duty-ratio boost converter is equal to the full wave rectified 3-phase voltage. Its equation is $$Vo2 = \sqrt{2} * Vi * \max\{|\operatorname{Sin} X|, |\operatorname{Sin}(X+120)|, |\operatorname{Sin}(X+240)|\}$$
(factored by the transformer turns-ratio).

The equations above are for balanced phase voltages. With unbalanced input phase voltages, the equations are more complex, but the net effect is similar. Also, the equations for the boost converter stage duty-rations also change when voltage feedback is used to regulate the output voltage, but only for the non-dominant phases. The voltage feedback makes the output ripple voltages of the boost and buck stages compliment exactly, for ripple-free output voltage and nearly ideal pfc. Given the power of SPICE simulation, it is fairly easy to model the circuit and apply variables such as phase imbalance. The results are easily visualized, unlike with a hairy equation, and the likelihood of making errors in a complicated derivation is avoided.

Phase Imbalance

Whether the control is analog or digital, the input voltages are measured with respect to the current vector reference voltage Vcvr, the node voltage of a three legged voltage divider as shown in FIG. 2. The neutral, even if present, is not useful for control, and Vcvr will depart from the neutral voltage if the phase voltages are not balanced.

Regardless of whether an analog, digital or hybrid control is used, many additional functions will be required to make a practical power converter that are above the scope of this presentation, as any power converter designer would understand and could implement.

These include such functions as over-voltage and under-voltage lock-out, overload current limiting, soft start, current balancing with parallel converters, etc., as well as input and output filtering as required, feedback through the isolation barrier, EMI control and so forth.

DEFINITIONS

1. In this specification and the claims, a "3-phase boost converter" is a circuit having three inputs to accept a 3-phase ac voltage and convert it to a dc voltage. The 3-phase boost converter is characterized by having an input inductor for each of the three inputs, with three switching means that may short circuit the respective input inductors when closed. When the respective switching means are open, respective currents from the respective input inductors flow to one or more boost capacitors. The 3-phase boost converter may include isolation such as a dc-dc transformer, as an example, not a limitation. The 3-phase ac voltage may return to a common node within the 3-phase boost converter (as in FIGS. 2 and 7), as examples, not limitations, or they may return to three isolated returns so that the 3-phase boost converter may be used with its inputs in series with a 3-phase buck converter (as in FIGS. 8 and 18), as examples, not limitations. The 3-phase boost converter is also characterized by having a dc output and a dc output return that may or may not be isolated from the ac inputs.

2. In this specification and the claims, a "3-phase buck converter" is a circuit having three inputs to accept a 3-phase ac voltage and convert it to a dc voltage. The 3-phase buck converter is characterized by having an input switching means for each of the three inputs that connect the respective three inputs to a buck inductor when closed. When the respective switching means are open, respective currents from the respective inputs are interrupted. The 3-phase buck converter may include isolation such as a dc-dc transformer, as an example, not a limitation. The 3-phase ac voltage may return through connections entirely within the 3-phase buck converter (as in FIGS. 1, 7, 8 and 19), as examples, not limitations, or they may return to three isolated returns so that the 3-phase buck converter may be used with its inputs in series with a 3-phase boost converter. The 3-phase buck converter is also characterized by having a dc output and a dc output return that may or may not be isolated from the ac inputs.

3. In this specification and the claims, a control circuit for operating a 3-phase boost converter at "0% duty-ratio" implements the following duty-ratio algorithm or a close approximation thereof:

$$Da = 1 - \frac{|\operatorname{Sin} X|}{\max\{|\operatorname{Sin} X|, |\operatorname{Sin}(X+120)|, |\operatorname{Sin}(X+240)|\}}$$

$$Db = 1 - \frac{|\operatorname{Sin}(X+120)|}{\max\{|\operatorname{Sin} X|, |\operatorname{Sin}(X+120)|, |\operatorname{Sin}(X+240)|\}}$$

$$Dc = 1 - \frac{|\operatorname{Sin}(X+240)|}{\max\{|\operatorname{Sin} X|, |\operatorname{Sin}(X+120)|, |\operatorname{Sin}(X+240)|\}}$$

The control circuit includes all timing, logic and driver circuits necessary to turn on and to turn off the boost switches to implement the algorithm. The control may be analog, digital or a hybrid of both A boost converter recited as having "0% duty-ratio" includes operation at increased duty-ratio to limit under-voltage transients.

4. In this specification and the claims, a control circuit for operating a 3-phase buck converter recited as having "100% duty-ratio" implements the following duty-ratio algorithm or a close approximation thereof:

$$Da = \frac{\operatorname{Sin} X}{\max\{|\operatorname{Sin} X|, |\operatorname{Sin}(X+120)|, |\operatorname{Sin}(X+240)|\}}$$

$$Db = \frac{\operatorname{Sin}(X+120)}{\max\{|\operatorname{Sin} X|, |\operatorname{Sin}(X+120)|, |\operatorname{Sin}(X+240)|\}}$$

$$Dc = \frac{\operatorname{Sin}(X+240)}{\max\{|\operatorname{Sin} X|, |\operatorname{Sin}(X+120)|, |\operatorname{Sin}(X+240)|\}}$$

The control circuit includes all timing, logic and driver circuits necessary to turn on and to turn off the buck switches to implement the algorithm. The control may be analog, digital or a hybrid of both.

In this specification and the claims, a buck converter recited as having "100% duty-ratio" includes operation at reduced duty-ratio to limit over-voltage transients.

5. In this specification and the claims, a "boost switch" or a "boost switching circuit" is a switching means that allows a current from a boost inductor to be connected to a boost capacitor when the switching means is turned off and that shunts the current from the boost inductor to a return when the switching means is turned on.

The boost switching circuit may be connected directly to the boost capacitor or it may be connected through other components such as a dc-dc transformer for isolation, as an example, not a limitation.

6. In this specification and the claims, a "buck switch" or a "buck switching circuit" is a switching means that allows a voltage from a voltage input to be connected to a buck inductor when the switching means is turned on and that disconnects the voltage from the buck inductor when the switching means is turned off. When the switching means is turned off, a catch diode means provides a conduction path for the buck inductor current from a return.

The buck switching circuit may be connected directly to the buck inductor or it may be connected through other components such as a dc-dc transformer for isolation, as an example, not a limitation.

7. In this specification and the claims, a 3-phase buck converter and a 3 phase boost converter are "connected with their inputs in parallel and their outputs in series" if they are connected as shown in FIG. 7. The order in which the outputs are connected in series is not important.

8. In this specification and the claims, a 3-phase buck converter and a 3-phase boost converter are "connected with their inputs in series and their outputs in parallel" if they are connected as shown in FIG. 8. The order in which the inputs are connected in series is not important, so a variant may have isolated primary circuits in the buck converter and the returns may be connected within the boost converter.

9. In this specification and the claims, a "boost switching circuit" comprises an input that may be an ac input, an inductor, and a "boost switch". The boost switch includes controls and driver circuits such that the boost switch alternately short-circuits the inductor to a return when closed and directs the current from the inductor to a boost capacitor when open. The boost capacitor may be connected directly to the boost switching circuit or it may be connected through other components such as a dc-dc transformer, as an example, not a limitation.

10. In this specification and the claims, a "buck switching circuit" comprises an input that may be an ac input and a "buck switch". The buck switch includes controls and driver circuits such that the buck switch alternately connects when closed and disconnects when open the input and a buck inductor. The buck inductor may be connected directly to the buck switching circuit or it may be connected through other components such as a dc-dc transformer, as an example, not a limitation.

11. In this specification and the claims, a "dc-dc transformer" is an ac transformer with primary switches and secondary rectifiers so that the dc-dc transformer as a whole accepts a dc voltage input and has a dc voltage output. The dc-dc transformer may be a variable dc-dc transformer having provisions to change its effective turns ratio. The "primary switches" is any switching network that may chop or de-rectify a dc voltage so that provides an alternating voltage excitation for the core of the ac transformer. Examples are a full-bridge switching circuit as seen in FIG. 18, as an example, not a limitation, or push-pull switches. The rectifiers may be diodes, Schottky diodes, synchronous rectifiers and so forth as examples, not limitation, and may be in a push pull configuration or a bridge configuration, as examples, not limitation.

12. In this specification and the claims, the primary switches of a dc-dc transformer may be operated so that the boost switches are "integrated into the primary switches", as shown in FIG. 18 and described in the specification with the discussion of FIG. 18 for the case where the optional boost switches 114-116 are not used. The boost switches are "separate from the primary switches" if the optional boost switches 114-116 are used as described in the specification with the discussion of FIG. 18 for the case where the optional boost switches are used.

13. In this specification and the claims, a recitation of a circuit operating in the forward direction as an ac-dc converter includes its reciprocal operating in the reverse directions as a dc-ac converter, with any modifications necessary for reversed current flow in the circuit and its control. Also, an ac-dc converter can be joined with a dc-ac converter to make an ac-ac converter.

The invention claimed is:

1. A 3-phase pfc ac-dc power converter comprising
a 3-phase boost converter,
a first control circuit for operating the 3-phase boost converter at "0% duty-ratio", such that
where X is a phase angle of a 3-phase sine wave voltage,
a phase A boost duty-ratio $D_{boost}a$ is approximately $$D_{boost}a = 1 - \frac{|\text{Sin}X|}{\max\{|\text{Sin}X|, |\text{Sin}(X+120)|, |\text{Sin}(X+240)|\}}$$

a phase B boost duty-ratio $D_{boost}b$ is approximately $$D_{boost}b = 1 - \frac{|\text{Sin}(X+120)|}{\max\{|\text{Sin}X|, |\text{Sin}(X+120)|, |\text{Sin}(X+240)|\}}$$

and a phase C boost duty-ratio $D_{boost}c$ is approximately $$D_{boost}c = 1 - \frac{|\text{Sin}(X+240)|}{\max\{|\text{Sin}X|, |\text{Sin}(X+120)|, |\text{Sin}(X+240)|\}}$$

a 3-phase buck converter, and
a second control circuit for operating the 3-phase buck converter at "100% duty-ratio," such that
where X is a phase angle of a 3-phase sine wave voltage,
a phase A buck duty-ratio $D_{buck}a$ is approximately $$D_{buck}a = \frac{\text{Sin}X}{\max\{|\text{Sin}X|, |\text{Sin}(X+120)|, |\text{Sin}(X+240)|\}}$$

a phase B buck $D_{buck}b$ duty-ratio is approximately $$D_{buck}b = \frac{\text{Sin}(X+120)}{\max\{|\text{Sin}X|, |\text{Sin}(X+120)|, |\text{Sin}(X+240)|\}}$$

and a phase C buck duty-ratio $D_{buck}c$ is approximately $$D_{buck}c = \frac{\text{Sin}(X+240)}{\max\{|\text{Sin}X|, |\text{Sin}(X+120)|, |\text{Sin}(X+240)|\}}$$

the 3-phase boost converter and the 3-phase buck converter being connected with their respective 3-phase inputs in parallel and with their outputs in series to reduce the ripple voltage in the output voltage.

2. A 3-phase pfc ac-dc power converter comprising a 3-phase boost converter, a first control circuit for operating the 3-phase boost converter-at "0% duty-ratio,"

such that where X is a phase angle of a 3-phase sine wave voltage, a phase A boost duty-ratio $D_{boost}a$ is approximately $$D_{boost}a = 1 - \frac{|\operatorname{Sin}X|}{\max\{|\operatorname{Sin}X|, |\operatorname{Sin}(X+120)|, |\operatorname{Sin}(X+240)|\}}$$

a phase B boost duty-ratio $D_{boost}c$ is approximately $$D_{boost}b = 1 - \frac{|\operatorname{Sin}(X+120)|}{\max\{|\operatorname{Sin}X|, |\operatorname{Sin}(X+120)|, |\operatorname{Sin}(X+240)|\}}$$

and a phase C boost duty-ratio $D_{boost}c$ is approximately $$D_{boost}c = 1 - \frac{|\operatorname{Sin}(X+240)|}{\max\{|\operatorname{Sin}X|, |\operatorname{Sin}(X+120)|, |\operatorname{Sin}(X+240)|\}}$$

a 3-phase buck converter, and a second control circuit for operating the 3-phase buck converter at "100% duty-ratio," such that where X is a phase angle of a 3-phase sine wave voltage, a phase A buck duty-ratio $D_{buck}a$ is approximately $$D_{buck}a = \frac{\operatorname{Sin}X}{\max\{|\operatorname{Sin}X|, |\operatorname{Sin}(X+120)|, |\operatorname{Sin}(X+240)|\}}$$

a phase B buck duty-ratio $D_{buck}b$ is approximately $$D_{buck}b = \frac{\operatorname{Sin}(X+120)}{\max\{|\operatorname{Sin}X|, |\operatorname{Sin}(X+120)|, |\operatorname{Sin}(X+240)|\}}$$

and a phase C buck duty-ratio $D_{buck}c$ is approximately $$D_{buck}c = \frac{\operatorname{Sin}(X+240)}{\max\{|\operatorname{Sin}X|, |\operatorname{Sin}(X+120)|, |\operatorname{Sin}(X+240)|\}}$$

the 3-phase boost converter and the 3-phase buck converter being connected with their respective 3-phase inputs in series and with their outputs in parallel to reduce the ripple current in the output current.

* * * * *